US010781063B2

(12) United States Patent
 Sucre

(10) Patent No.: US 10,781,063 B2
(45) Date of Patent: Sep. 22, 2020

(54) FULLY AUTOMATED CEMENT HORIZONTAL STORAGE

(71) Applicant: Luis Sucre, Plano, TX (US)

(72) Inventor: Luis Sucre, Plano, TX (US)

( * ) Notice: Subject to any disclaimer, the term of this patent is extended or adjusted under 35 U.S.C. 154(b) by 0 days.

(21) Appl. No.: 15/732,799

(22) Filed: Jan. 2, 2018

(65) Prior Publication Data
US 2018/0251324 A1 Sep. 6, 2018

Related U.S. Application Data

(60) Provisional application No. 62/600,824, filed on Mar. 6, 2017.

(51) Int. Cl.
| | |
|---|---|
| *B65G 53/32* | (2006.01) |
| *B65G 69/06* | (2006.01) |
| *B65G 67/04* | (2006.01) |
| *B65G 53/22* | (2006.01) |
| *B65D 88/02* | (2006.01) |
| *B65D 88/72* | (2006.01) |
| *B65D 90/62* | (2006.01) |
| *B65G 65/28* | (2006.01) |

(52) U.S. Cl.
 CPC .............. *B65G 69/06* (2013.01); *B65D 88/02* (2013.01); *B65D 88/72* (2013.01); *B65D 90/623* (2013.01); *B65G 53/22* (2013.01); *B65G 65/28* (2013.01); *B65G 67/04* (2013.01); *B65G 2201/04* (2013.01)

(58) Field of Classification Search
 CPC ........ B65D 53/32; B65D 53/22; B65D 65/28; B65G 53/32; B65G 53/22; B65G 65/28; B65G 69/0408; B65G 69/0441; B65G 69/0458; B65G 69/0491
 USPC ........ 198/509, 519; 406/79, 81, 197, 88, 89; 414/299, 300, 301
 See application file for complete search history.

(56) References Cited

U.S. PATENT DOCUMENTS

| | | | | |
|---|---|---|---|---|
| 3,069,027 A | * | 12/1962 | Dischinger | ............ B65G 65/28 198/518 |
| 3,188,145 A | * | 6/1965 | Strong | ................... B65G 53/32 406/41 |
| 3,224,604 A | * | 12/1965 | Imre Adler | ............ B65G 65/20 198/519 |
| 3,363,785 A | * | 1/1968 | Kucera | ............... A01F 25/2009 414/318 |
| 3,565,288 A | * | 2/1971 | Shute | ..................... A01C 15/18 222/55 |

(Continued)

*Primary Examiner* — Joseph A Dillon, Jr.
(74) *Attorney, Agent, or Firm* — Librado Tena

(57) ABSTRACT

The present invention is a new method to efficiently reclaim cement from a horizontal warehouse. This new reclaiming method combines a mechanical cement reclaiming machine, together with a reduced amount of open air slides. Material is fluidized through a porous media with low pressure air. Material flow is achieved by sloping the Air slide conveyor to match the fluidized angle of repose of the powdered material. Further, the present invention introduces a conveying system, comprising a cascade of open and enclosed air slides and elevator machines, to convey the cement from the reclaiming area to a dispatch hopper. The introduction of these components, together with cement stacking and dispatch systems, is a Fully Automated Cement Horizontal Storage system and method.

8 Claims, 10 Drawing Sheets

(56) References Cited

U.S. PATENT DOCUMENTS

| | | | | |
|---|---|---|---|---|
| 3,604,757 A * | 9/1971 | White | B65G 65/28 | 406/39 |
| 3,767,030 A * | 10/1973 | Briggs | B65G 65/20 | 198/518 |
| 4,000,822 A * | 1/1977 | Raabe | B65G 65/16 | 414/133 |
| 4,121,724 A * | 10/1978 | Fischer | B65G 65/06 | 198/508 |
| 4,154,332 A * | 5/1979 | Schlegel | B65G 65/06 | 198/507 |
| 4,244,463 A * | 1/1981 | Bartley | B65G 65/06 | 198/508 |
| 4,318,466 A * | 3/1982 | Allard | B65G 65/28 | 198/511 |
| 4,392,566 A * | 7/1983 | Tschantz | B65G 65/20 | 198/509 |
| 4,417,832 A * | 11/1983 | Krauss | B65G 53/22 | 406/90 |
| 4,440,499 A * | 4/1984 | Tomikawa | B28C 5/123 | 366/10 |
| 4,512,705 A * | 4/1985 | Gutsch | B65G 65/42 | 198/550.12 |
| 4,548,315 A * | 10/1985 | Briggs | B65G 67/606 | 198/304 |
| 4,775,275 A * | 10/1988 | Perry | B28C 7/0495 | 366/18 |
| 5,187,097 A * | 2/1993 | Weber | C05F 17/0235 | 435/290.2 |
| 5,230,587 A * | 7/1993 | Pensoneau | B09B 1/00 | 405/1 |
| 5,959,870 A * | 9/1999 | Hurwitz | G01N 23/222 | 198/508 |
| 5,972,696 A * | 10/1999 | Lipsey | C05F 5/002 | 435/290.4 |
| 7,101,140 B2 * | 9/2006 | Jonkka | B65G 3/02 | 198/519 |
| 7,427,182 B2 * | 9/2008 | Galijan | B28C 7/0481 | 141/263 |
| 7,845,487 B1 * | 12/2010 | Fischer | B65G 69/188 | 198/364 |
| 7,954,631 B1 * | 6/2011 | Weaver | B65G 19/24 | 198/465.3 |
| 8,177,053 B2 * | 5/2012 | Hood | B65G 15/60 | 198/508 |
| 8,376,125 B2 * | 2/2013 | Boyce | B65G 65/28 | 198/303 |
| 8,784,013 B2 * | 7/2014 | Watson | B65G 53/56 | 137/561 A |
| 8,905,681 B2 * | 12/2014 | Schneider | B65G 53/06 | 209/139.1 |
| 9,533,840 B1 * | 1/2017 | Zeilinger | B65G 65/28 | |
| 2001/0008604 A1 * | 7/2001 | Gorp | B65G 65/32 | 414/293 |
| 2003/0029699 A1 * | 2/2003 | Stoner | B28C 7/0007 | 198/525 |
| 2007/0039802 A1 * | 2/2007 | Kahrger | B65G 41/008 | 198/303 |
| 2011/0132719 A1 * | 6/2011 | Tebbe | B65G 65/28 | 198/301 |
| 2012/0138426 A1 * | 6/2012 | Cruz | E02F 3/181 | 198/509 |
| 2017/0217689 A1 * | 8/2017 | Holden | B65G 53/66 | |
| 2018/0186581 A1 * | 7/2018 | Kilic | B65G 65/28 | |
| 2018/0194569 A1 * | 7/2018 | Tebbe | B65G 41/008 | |
| 2019/0031454 A1 * | 1/2019 | Sucre | B65G 67/06 | |

* cited by examiner

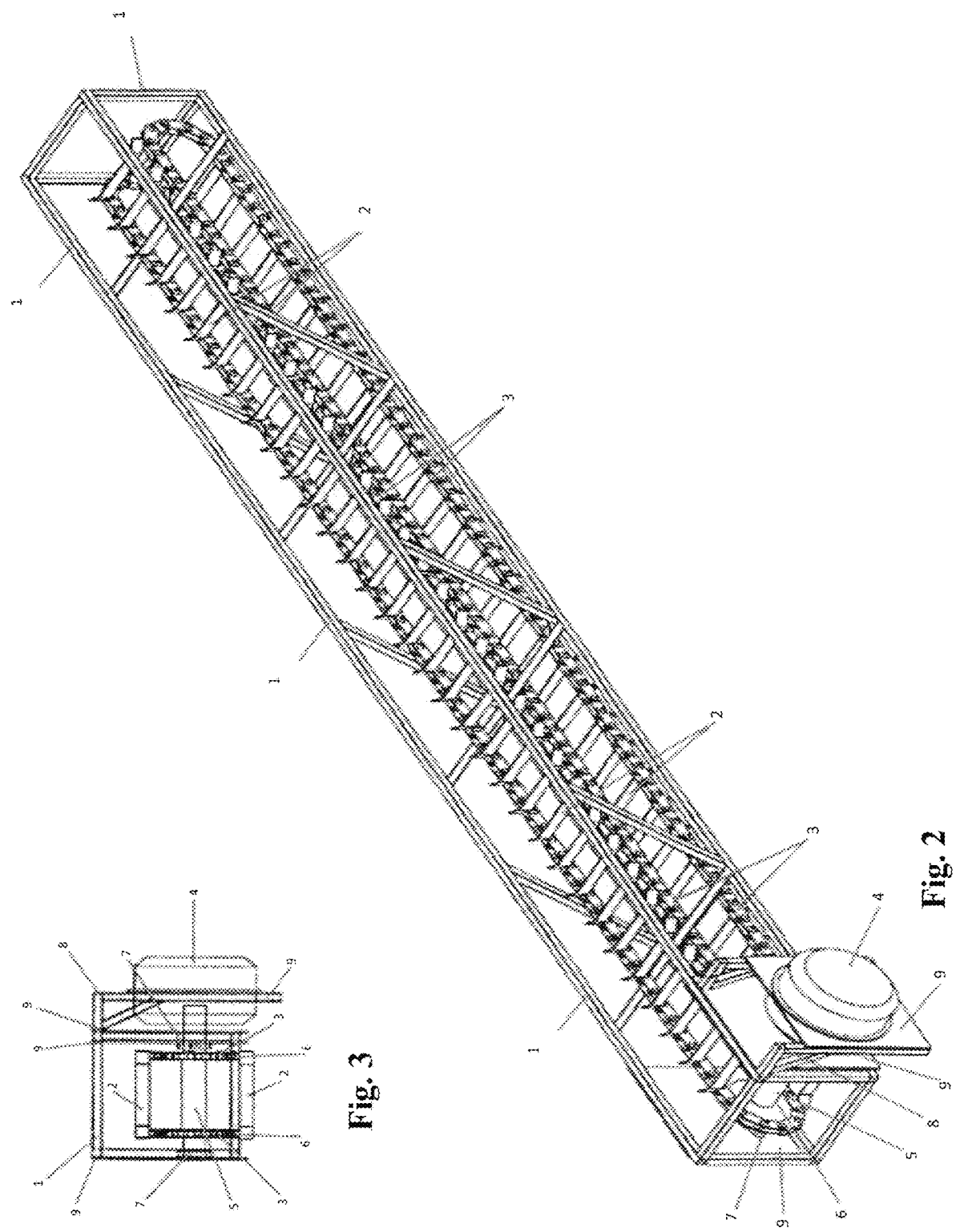

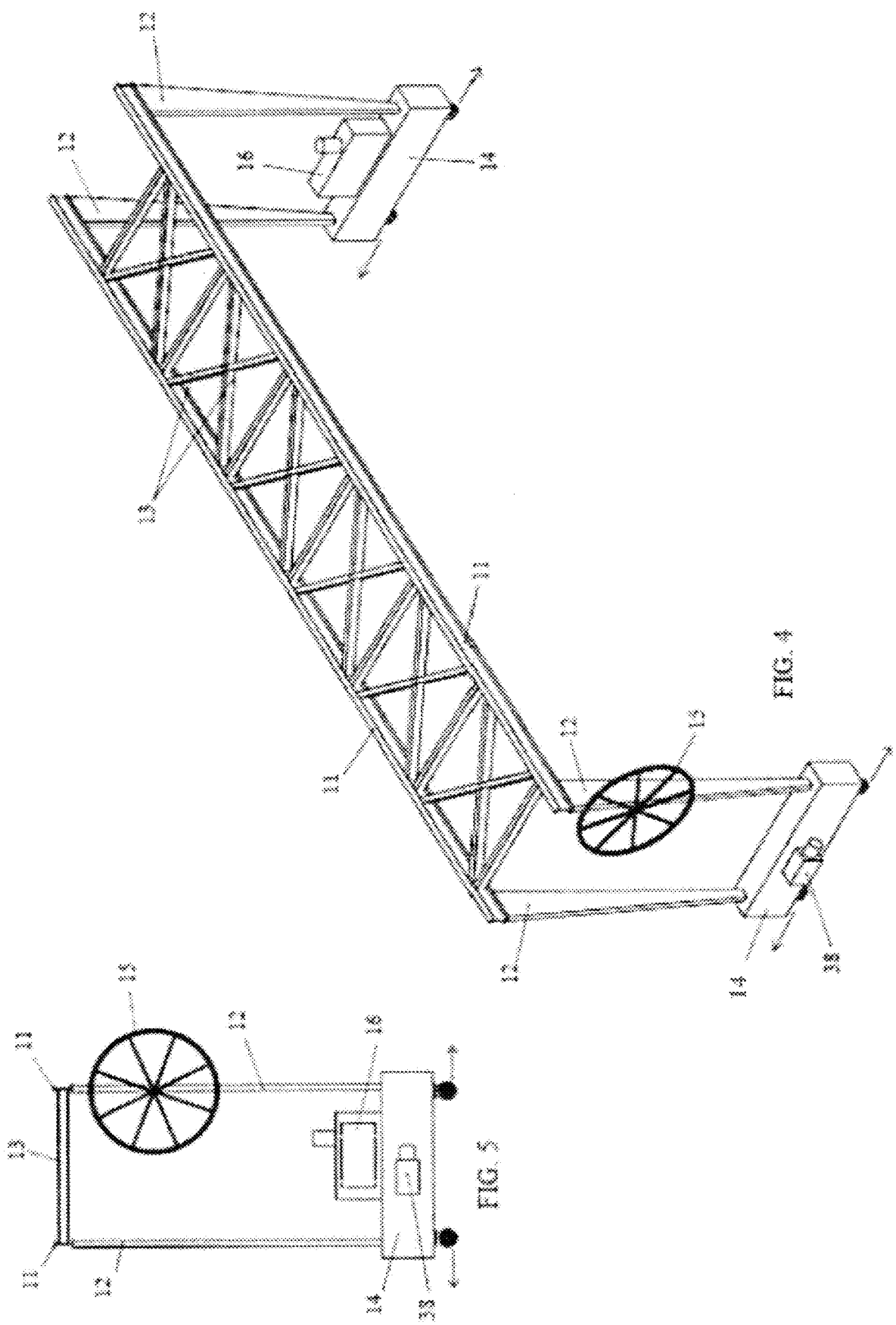

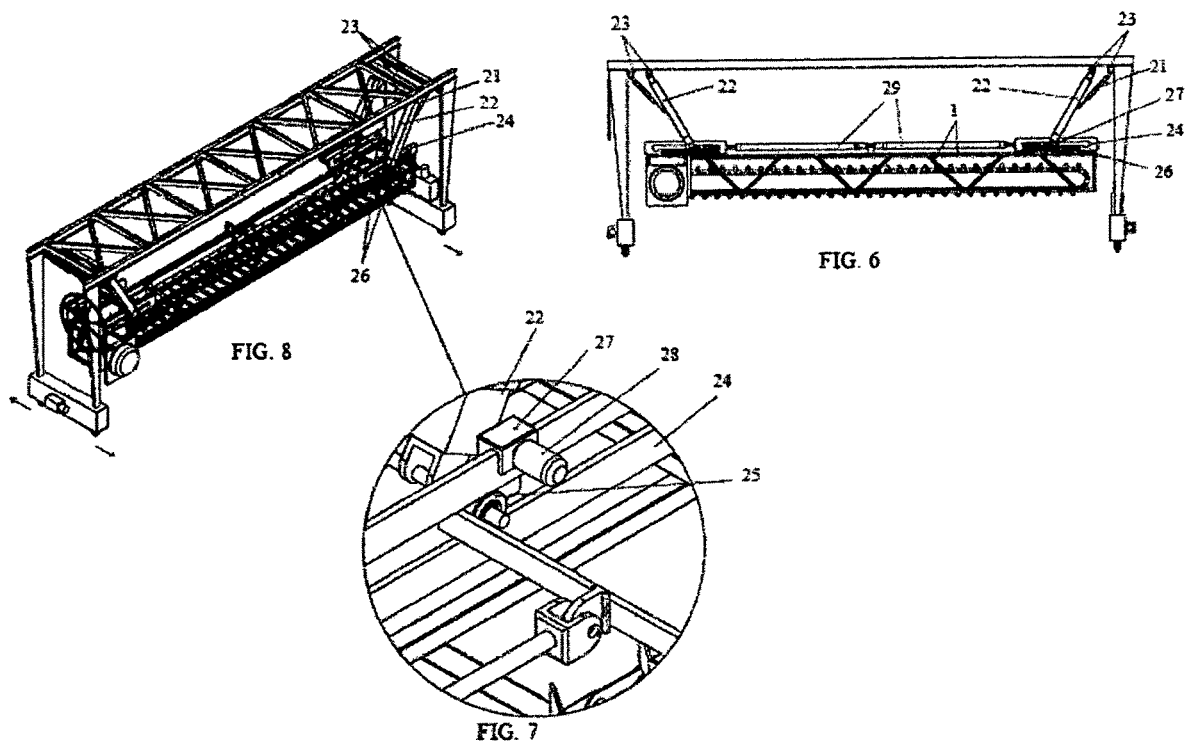

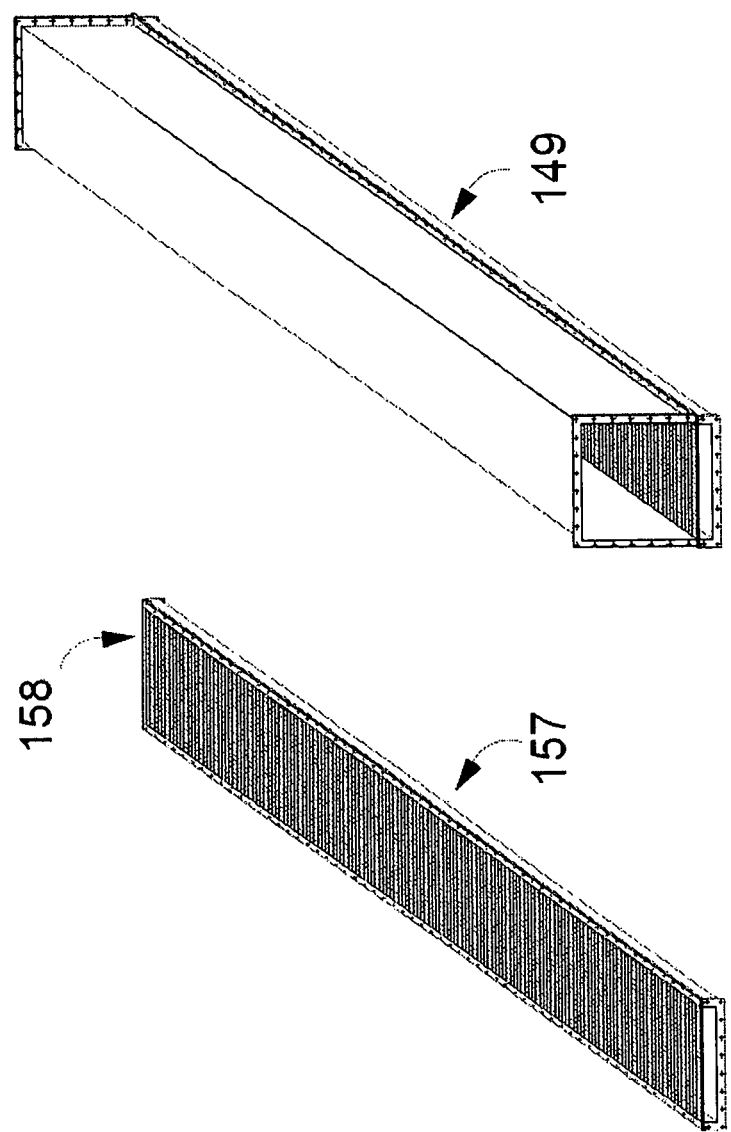

FULLY AUTOMATED CEMENT HORIZONTAL STORAGE

CROSS-REFERENCE TO RELATED APPLICATIONS

Incorporated by reference is provisional patent application U.S. 62/600,824 filed 8 Mar. 6, 2017 which describes a Fully Automated Cement Horizontal Storage System and Method, comprising a U Reclaimer as a means of movement of cement or related material to a collection means for loading into material transporting vehicles.

STATEMENT REGARDING FEDERALLY SPONSORED RESEARCH OR DEVELOPMENT

"Not Applicable"

THE NAMES OF THE PARTIES TO A JOINT RESEARCH AGREEMENT

"Not Applicable"

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

"Not Applicable"

STATEMENT REGARDING PRIOR DISCLOSURES BY THE INVENTOR OR A JOINT INVENTOR

Incorporated by reference is provisional patent application U.S. 62/600,824 filed Mar. 6, 2017 which describes a Fully Automated Cement Horizontal Storage System and Method, comprising a U Reclaimer as a means of movement of cement or related material to a collection means for loading into material transporting vehicles.

BACKGROUND OF THE INVENTION

(1) Field of the Invention

The field of this invention relates to cement handling systems and more particularly to a bulk cement storage system comprising a fully automated cement horizontal storage system.

(2) Description of Related Art Including Information Disclosed Under 37 CFR 1.97

After being manufactured, cement was stored in large, low level shelters either loose or in bags. The cement, if stored loose was removed by means of mechanical shovels to move the cement to a ship or car for transportation. If stored in bags, these bags were stacked and carried off to a ship or railroad car for transportation. However, this mode of operation proved inefficient and costly since much of the cement was damaged by environmental conditions such as moisture or spoilage by contamination. As a result, bulk handling technology was developed, using cast concrete cylinders, generally called "silos" to hold the loose cement. These silos were tall and narrow so that the height of the stored cement would provide gravity force for getting the cement out of the bottom of the silo by mechanical means.

With the development of pneumatic conveyors, improved bulk handling techniques resulted. The cement could now be efficiently transferred from silos either through pneumatic conveying system, a pneumatic ship unloader, a mechanical conveying system, a self unloader vessel or bunkers. The silos were the storage containers.

Transport by bulk is now becoming increasingly the primary mode of cement distribution. Cement at the plant is generally stored in silos from where the cement leaves the plant either in bags or in bulk. Bagged movement will require bagging machines, truck loading conveyors, etc. while bulk movement is generally done through enclosed bulk tankers which are pressure vessels. Currently cement companies are moving cement in bulk through such bulk tankers but the costs are not working out to be economical considering the low unit volumes due to poor road conditions and empty returns.

Bulk transport of cement is generally carried out by means of covered hopper railroad cars at plants which have the availability of a railroad siding. At locations generally removed from railroad lines, pneumatic truck trailers are used. The pneumatic conveyors bring and remove the cement to these conveying vehicles. Pneumatic conveyors have played an important role in the development of marine distribution of cement. Many bulk handling ships are mechanically configured to be self-unloading for the most part. The cement is stored in the floors of the holds of the ship and the cement is extracted and transferred to a dockside storage facility which is then used to distribute the cement.

Bulk handling technology for cement has provided both time and cost savings. Other advantages of bulk storage and handling of cement include avoidance of broken bags of cement, necessity to provide dry storage areas, and using bulk distribution of cement to batch manufacturing sites.

Despite the development of bulk handling technology, as well as pneumatic conveyor systems, the installation of a cement storage and distribution center has been costly and required a great amount of time to construct distribution centers. A basic reason for this cost is the storage of cement in silos. Silo construction generally takes years to construct and is very expensive. A typical cylindrical silo is about 10 meters in diameter and can be as high as 50 meters. Cement is fed into the storage silos and contained there until distribution is needed. Because of the poor flow characteristics of cement, silos are typically very tall and narrow so that a flow of cement can be obtained by gravitational force on the column of cement which pushes it downward. Cement can then be removed at the bottom of the silo by means of a screw mechanism or a solid fuel pump. Powdered cement when stacked to great heights in the silo tends to transfer its weight to the walls of the silo as well as the base of the silo. Because of the great height, it is necessary to construct the silo walls to be very thick and strong throughout the full height of the silo. This causes silo construction to be expensive and of long duration.

The origin of the flat storage system is based on the availability of old and unused warehouses at many ports and harbors. Such warehouses are converted into waterproof and airtight enclosures and the cement is pumped in from the ship either through pneumatic conveying systems, a pneumatic ship unloader, a mechanical conveying system, a self-unloader vessel or bunkers. The flat storage is an option to building large and expensive cylindrical silos which also take time to build.

It is accordingly an objective of the present invention to avoid the problems of prior art devices. A further object of the present invention is to provide a bulk cement storage system which can be constructed at reduced cost and shorter construction time.

It is yet a further object of the present invention to provide a bulk cement storage system which does not require very thick, strong, weight bearing walls.

It is still a further object of the present invention to provide a bulk cement storage system which permits storage of cement in horizontal free-standing piles.

These and further objects, features and advantages of the present invention will become obvious from a detailed description of the invention, taken in conjunction with the accompanying drawings, which form an integral part thereof.

SUMMARY OF THE INVENTION

This invention relates to cement handling systems and more particularly to a bulk cement storage system comprising a fully automated cement horizontal storage system to efficiently reclaim cement from a horizontal warehouse. This new reclaiming method combines a mechanical cement reclaiming machine, together with a reduced amount of open air slides. Material is fluidized through a porous media with low pressure air. Material flow is achieved by sloping an air slide conveyor to match a fluidized angle of repose of the powdered material. Further, the present invention introduces a conveying system, comprising a cascade of open and enclosed air slides and elevator machines, to convey the cement from the reclaiming area to a dispatch hopper. The introduction of these components, together with automated cement reclaiming, stacking and dispatch systems, is a Fully Automated Cement Horizontal Storage system and method.

BRIEF DESCRIPTION OF THE DRAWINGS

FIG. 2 is an isometric drawing of a Reclaimer Main Structure 1 which supports Reclaimer Chain 3 mounted with Scrapers 2. A Motor Structure 8 and Metal Plate 9 support a Hydraulic Direct Drive Motor 4 which couples to Sprocket 6 mounted on Motor Shaft 5. A Pillow Block Bearing 7 is shown mounted on Motor Shaft 5.

FIG. 3 is a front plan view drawing of a Reclaimer Main Structure 1 supporting a Hydraulic Direct Drive Motor 4 mounted on Motor Structure 8 and Metal Plate 9. A plurality of Pillow Block Bearings 7 are shown mounted on Motor Shaft 5. A front view of Reclaimer Chain 3 is shown with Scrapers 2 mounted on Reclaimer Chain 3.

FIG. 4 is an isometric drawing of a gantry frame structure of the U Reclaimer of the present invention. A gantry of the U Reclaimer 45 of FIG. 1 comprises a frame structure whose upper part includes two parallel Upper Girders 11 at opposite ends with diagonal and transverse Vertical Girders 12 for support. Steel Beams 13 attach to Upper Girders 11 to complete an upper gantry frame structure of the U Reclaimer 45 of FIG. 1. Supporting both parallel Upper Girders 11 are four total Vertical Girders 12 which are provided with pre-manufactured Motorized End Carriages 14, as shown two in total. A Geared Motor 17 is provided with the pre-manufactured Motorized End Carriages 14 provides motive power for the U Reclaimer 45 gantry's movement. A Cable Reel 15 is also shown in FIG. 4. A Hydraulic Power Unit 16 is shown mounted on a Motorized End Carriage 14.

FIG. 5 is a front view drawing of the gantry frame structure of the U Reclaimer of the present invention. Motorized End Carriage 14 comprises two Carriage Wheels 18 for directional motion of a gantry frame structure of the U Reclaimer 45 of FIG. 1. Also shown in FIG. 5 is a Motorized End Carriage 14 with Geared Motor 17. Vertical Girders 12 support Upper Girders 13 attached with Steel Beams 13. Cable Reel 15 is mounted on an Upper Girder 11.

FIG. 6 is a side view drawing of U Reclaimer 45 showing a side view of the isometric drawing of FIG. 1. A Gantry Frame Structure with a Support Suspension Assembly shown in FIG. 6 comprises four Main Hydraulic Cylinders 22 for movement, four Elevation Hydraulic Cylinders 21 on both sides of Gantry Frame Structure with a Suspension Assembly and two Hydraulic Pistons 29 parallel to Reclaimer Main Structure 1. The Gantry Frame Structure with a Suspension Assembly can be lowered on both ends, vertically or diagonally to accomplish movement of material by the U Reclaimer 45, as previously disclosed in FIG. 1 and FIG. 2. Elevation Hydraulic Cylinders 21 control angular movement of Gantry Frame Structure with a Suspension Assembly. Main Hydraulic Cylinders 22 and Hydraulic Pistons 29 control axial movement of Gantry Frame Structure with a Suspension Assembly. The bottom connecting part of Main Hydraulic Cylinders 22 are attached to a Mechanical Brake System 27 shown in more detail in FIG. 7. Mechanical Brake System 27 is mounted on a Slotted Guide 24 inside of which is a V-Groove Wheel 25 which travels on an axial slot that allows movement of U Reclaimer 45.

FIG. 7 is a detailed isometric drawing of a Slotted Guide 24 showing a Mechanical Brake System 27 which is activated by Brake Hydraulic Piston 28 to stop axial movement of Main Hydraulic Cylinder 22 which is connected to V-Groove Wheel 25 which travels on an axial slot that allows movement of the U Reclaimer.

FIG. 8 is an isometric drawing of Gantry Frame Structure with a Suspension Assembly showing Hydraulic Cylinders Support 23, Main Hydraulic Cylinders 22, Elevation Hydraulic Cylinders 21, Slotted Guide 24, and High Strength Steel Frame 26.

FIG. 14 is an isometric drawing of a Fully Automated Cement Horizontal Storage System of the present invention showing enclosed air slide 320, enclosed air slide 321, open air slide 322, dust collector 323, screw conveyor 324, and rail 325 to allow movement of U Reclaimer 45 along horizontal cement storage housing 91 to reclaim cement stored within.

FIG. 16 is an isometric drawing of an open aeroslide 157 and an enclosed aeroside 149.

DETAILED DESCRIPTION OF THE INVENTION

Figure 1:
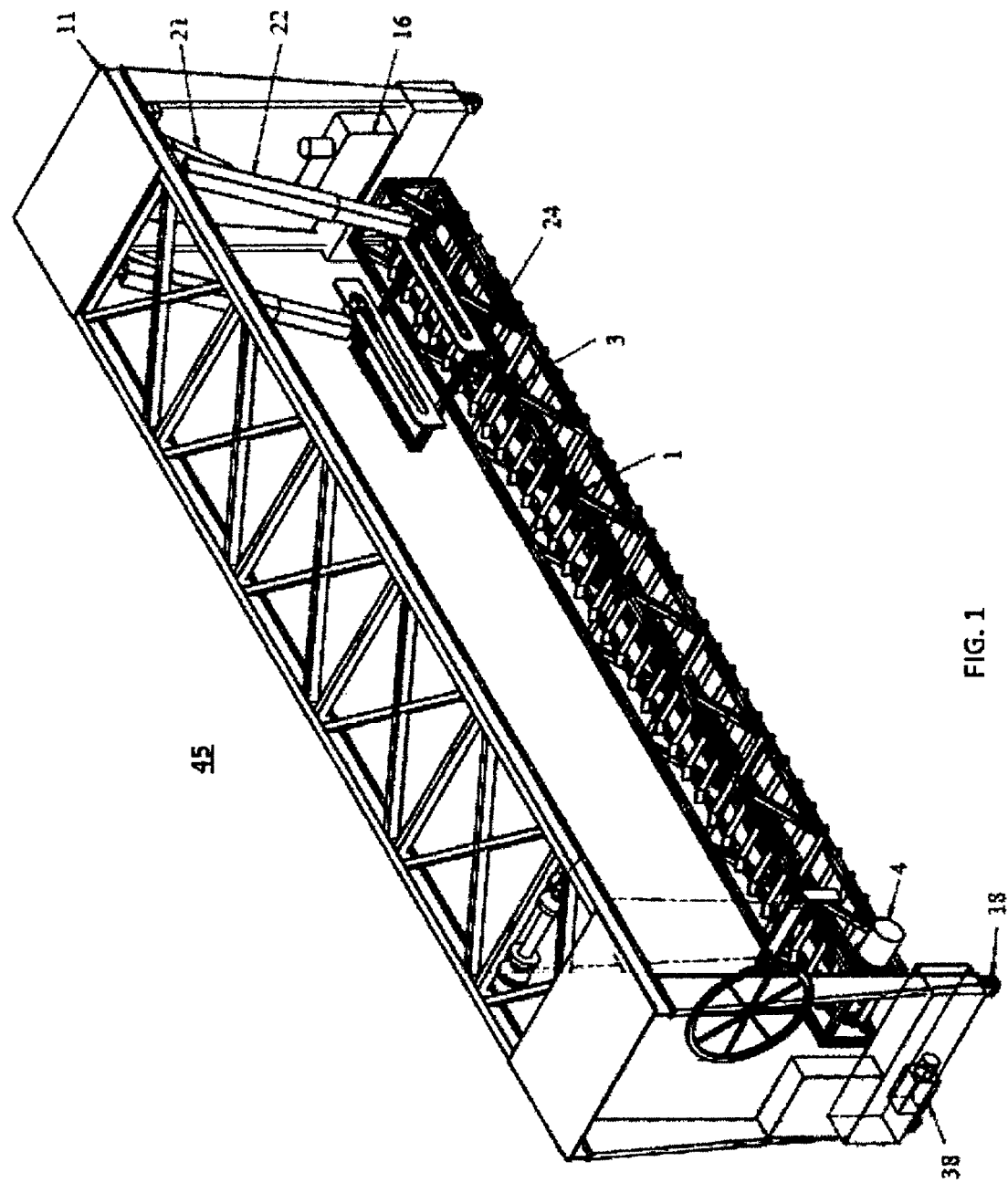
FIG. 1 is an isometric drawing showing main components of U Reclaimer 45 of the present invention showing Upper Girders 11, Elevation Hydraulic Cylinders 21, Main Hydraulic Cylinders 22, Hydraulic Power Unit 16, Slotted Guide 24, Reclaimer Main Structure 1, Reclaimer Chain 3, Hydraulic Direct Drive Motor 4, Carriage Wheels 18 and Motor 38. Other components of U Reclaimer 45 will be shown in further figures, FIG. 2 through FIG. 13.

Incorporated by reference is provisional patent application U.S. 62/600,824 filed on Mar. 6, 2017 which describes a Fully Automated Cement Horizontal Storage System and Method, comprising a U Reclaimer as a means of movement of cement or related material to a collection means for loading into material transporting vehicles.

The present invention relates to cement handling systems and more particularly to a bulk cement storage system comprising a fully automated cement horizontal storage system. Reclaiming of cement once stored in horizontal storage is accomplished through use of a mechanical cement reclaiming machine and cascaded air slides which is the novelty of the present invention as described further. Air slides are further named aeroslides for this disclosure.

The use of flat storages or warehouses to store cement is a world-wide practice. Even though it is relatively easy to store cement inside a horizontal warehouse using a pneumatic conveying system, the reclaiming of the product has been very problematic, inefficient and costly. Normally the cement is reclaimed from a horizontal warehouse using a fully aerated floor, or introducing a front loader with an operator inside the warehouse, who pushes the material towards an aerated pit. The first reclaiming system mentioned above is expensive and consumed large amount of energy, while the second method is extremely dangerous and is banned by safety agencies.

The origin of flat storage systems is based on the availability of old and unused warehouses at many ports and harbors. Such warehouses are converted into waterproof and airtight enclosures and cement is pumped in from a ship either through pneumatic ship unloaders, self-unloading ships or bunkers. Cement is also unloaded into storage from railroad cars or cement carrying trucks. The flat storage is an option to building large and expensive cylindrical silos which also take time to build.

The present invention is a new method to efficiently reclaim cement from a horizontal warehouse. This new reclaiming method combines a mechanical cement reclaiming machine, together with a reduced amount of open air slides and enclosed air slides, also named open aeroslides and enclosed aeroslides in this disclosure.

Air slide conveyors use the force of gravity to do most of the work without any moving parts. Material is fluidized through a porous media with low pressure air. Material flow is achieved by sloping the Air slide conveyor to match the fluidized angle of repose of the powdered material. At the correct slope, fluidized materials flow with the fluidity of a liquid.

Energy requirements are minimal because only a small volume of air at a low pressure is required to move material. These systems are installed overhead, conserving floor space.

Further, the present invention introduces a conveying system, comprised of a mechanical reclaiming machine, a cascade of enclosed air slides, and elevator machines to convey the cement from a reclaiming area to a dispatch hopper. The introduction of these components, together with traditional cement stacking methods and dispatch systems, has allowed development of a Fully Automated Cement Horizontal Storage (FACHS) facility.

The FACHS system and method is adaptable to various means of bulk material delivery, one of which is the unloading of cement from a cargo ship through use of an unloading boom delivering cement to a receiving hopper, and further delivering cement to a delivery line. A screw pump conveys cement from the receiving hopper to a cement delivery line. This main cement delivery line delivers cement to a horizontal cement storage housing through a plurality of storage cement delivery lines which have a plurality of outlets to distribute the cement or bulk material evenly. Air blowers provide air into the plurality of delivery lines to move the cement, the air giving cement a liquid like consistency and flow to facilitate cement flow through the plurality of storage cement delivery lines.

The purpose of the plurality of outlets from a storage cement delivery line into the horizontal storage is to deliver cement in an even distribution to allow reclaiming of the cement when needed by a U Reclaimer of the present invention. A U Reclaimer is suspended by gantry supports to reclaim cement from a horizontal storage housing. The U Reclaimer is a mechanical reclaiming machine, which travels either on rails or rubber tires, suspended by a gantry structure with gantry supports. The U Reclaimer mechanically scrapes cement or bulk material by blades attached to a conveyor which rotates to move cement to open aeroslides and further into enclosed aeroslides to deliver cement to a delivery hopper by collecting cement and delivering cement to a vertical conveyor which elevates cement to the delivery hopper. Cement from the delivery hopper is delivered to an enclosed air slide to deliver cement through a delivery spout to load cement unto a cargo truck. Automation is further described in this disclosure which controls the various motors, valves, pneumatic lines and accessory equipment which control operations of the various FACHS components.

Cement is stored between four walls of concrete which forms a cement horizontal storage housing. The storage volume between the concrete walls, as well as the height, width and length of each concrete wall depends on the building height and the total capacity of the cement to be stored. To guarantee even distribution of the product between the walls, the total length of the storage area is divided in several sectors, as necessary to cover the entire volume of cement storage housing.

A cement horizontal storage housing is divided into several sectors, as necessary to cover the entire volume of the cement storage. Each sector is fed by a storage cement delivery line with several outlets, delivery spouts, arranged transversally, normally between 4 and 5 outlets. Each outlet is opened and closed by means of two (2) la pneumatic operated butterfly valves. The distribution of product to each sector is achieved by means of pneumatic two-way valves, located outside the building. Several limit switches are installed longitudinally on the retaining walls of the horizontal cement storage, one for each sector. The limit switches provide a signal to the control room to automatically open and close the pneumatic butterfly valve of a specific outlet and/or to open and close a specific two-way valve of the sector that will be filled with cement.

Cement will be reclaimed by activating through aerating an open aeroslide of a specific sector, located adjacent to one of the longitudinal retaining walls of the cement storage housing, in combination with a mechanical reclaimer, the U Reclaimer of the present invention. The difference in pressure created when an open aeroslide is activated results in that the material on the top of the open aeroslide will fall towards the center of each sector. The U Reclaimer will then keep feeding material towards the open aeroslide of the activated sector. Each sector is activated automatically depending on the position along the FACHS of the U Reclaimer. Either encoders or several limit switches are arranged along the traveling pad of the U Reclaimer. These limit switches will send a signal to a control room, indicating the position of the U Reclaimer, activating the sector where the U Reclaimer is located.

Once the material above the open aeroslides has been reclaimed, then the U Reclaimer starts pushing material towards the open aeroslides. U reclaimer starts reclaiming of product from the top of the pile, slicing a section of the pile. A Gantry Frame Structure with a Suspension Assembly as shown in FIG. 8 is further named a reclaiming arm of the U Reclaimer, and this reclaiming arm is lowered as long as the product is being reclaimed. The reclaiming arm of the U Reclaimer may work in an angle, above the angle of repose of cement (30°) to facilitate the reclaiming operations. Once the product of one layer has been totally reclaimed, then the reclaiming arm is raised and the gantry travels to reclaim a next slice of the pile. This procedure is repeated to complete the reclaiming of the pile.

A U reclaimer comprises a gantry structure supporting a reclaiming arm. The operation features of a U reclaimer are described as follows:

i. Travelling

The gantry travels along the FACHS by means of either rails, arranged along outside the longitudinal walls, or rubber tires. Two electrical motors on each side of the gantry, rotating at the same speed move the gantry along the FACHS. The speed of the U reclaimer is controlled by a speed control mechanism.

ii. Speed Control

A vibrating sensor attached on the reclaiming arm indicates if the gantry is traveling too fast or if the reclaiming arm is too deep inside the product, reducing the speed of the machine, and adjusting the height of the reclaiming arm.

A delivery hopper loads cement into cement carrying trucks. To facilitate accurate flow control of the delivery hopper dispatch system, air slides are designed with computer controlled flow control gates. One is installed at the discharge of delivery cement hopper to control the flow rate and another at the discharge end of an enclosed air slide to stop flow when a desired weight is attained. Operation is as flows: first a gate at the discharge end of the air slide opens allowing cement to flow from the air slide into the delivery spout. Next, the flow control gate at the supper end of the air slide opens to allow the desired flow rate.

An FACHS system comprises a system of dust collectors and fans. The cement collected by the system dust collectors is conveyed by a screw conveyor to the delivery hopper, one dust collector for each sector.

The present invention further relates to automated cement handling systems or similar materials handling systems and more particularly to a Fully Automated Cement Horizontal Storage system and method comprising a reclaiming device of the present invention, a U Reclaimer, for reclaiming of product from a cement horizontal storage facility or similar material horizontal storage facility. Reclaiming of cement once stored in horizontal storage is performed through use of a mechanical cement reclaiming machine, a U Reclaimer, of the present invention. Cascade air slides are used to remove stored material recovered by a U Reclaimer as described further. Turning now to drawings which further describe the present invention:

FIG. 1 is an isometric drawing showing main components of U Reclaimer 45 of the present invention showing Upper Girders 11, Elevation Hydraulic Cylinders 21, Main Hydraulic Cylinders 22, Hydraulic Power Unit 16, Slotted Guide 24, Reclaimer Main Structure 1, Reclaimer Chain 3, Hydraulic Direct Drive Motor 4, Carriage Wheels 18 and Motor 38. Other components of U Reclaimer 45 will be shown in further figures, FIG. 2 through FIG. 13.

U Reclaimer 45 travels along a horizontal storage by means of either rails or rubber tires, named Carriage Wheels 18. Two Motors with Encoders 38, one in front and one at the end of U Reclaimer 456, both Motors with Encoders 38 rotate at the same speed to move U Reclaimer 45 along a horizontal storage of bulk material. The speed of U Reclaimer 45 is controlled as described further. A vibrating sensor attached on a Reclaimer Main Structure indicates if U Reclaimer 45 is traveling too fast or if the Reclaimer Main Structure is too deep inside the storage material, reducing the speed of U Reclaimer 45, and adjusts height of Reclaimer Main Structure 1. Main components of U Reclaimer 45 are the following:

a) U Reclaimer 45 Carriage Wheels 18

U Reclaimer 45 travels along a horizontal storage facility by means of steel flanged Carriage Wheels 18 arranged outside of longitudinal walls of a horizontal storage facility on rails, or rubber Carriage Wheel 18 tires. These Carriage Wheels can also travel on the walls of a horizontal storage or on ledges attached to the walls of a horizontal storage.

b) Hydraulic Power Unit 16

A Hydraulic Power Unit 16 is installed at end of U Reclaimer 45 as shown in FIG. 1. All movable components that are in direct contact with storage material, such as the Reclaimer Main Structure 1 and a Reclaimer Chain 3 will be driven by means of hydraulic fluid pressure. However, these components may also be driven using electrical motors.

c) U Reclaimer 45 Hydraulic Cylinders 21 and 22

A Reclaimer Main Structure 1 is lowered and lifted by means of Elevation Hydraulic Cylinders 21 and Main Hydraulic Cylinders 22. The Reclaimer Main Structure 1 may work inclined towards an open aeroslide to facilitate a product reclaiming operation.

d) Reclaimer Chain 3

A Reclaimer Chain 3 is operated by means of a Hydraulic Direct Drive Motor 4 to push stored material towards an open aeroslide of a horizontal storage facility. Reclaimer Chain 3 has blades attached to allow pushing of stored material. Reclaimer Chain 3 runs on channels and has two sprockets on each side of Reclaimer Main Structure 1. Four or two hydraulic cylinders, according to density of material being reclaimed, are attached to the side of Reclaimer Main Structure 1 and to top of U Reclaimer 45 to avoid transversal and longitudinal movement of Reclaimer Main Structure 1 when material is being pushed or when U Reclaimer 45 touches the side of a stored material pile.

e) Limit Switches and Control

U Reclaimer 45 is fully automated. However, the initial positioning of U Reclaimer 45 must be performed by an operator using a remote control. Once the machine has been positioned at the beginning of a stored material pile, then U Reclaimer 45 can work completely in automatic mode.

Either encoders or several limit switches have been arranged along a horizontal storage facility to indicate the position of U Reclaimer 45 on a horizontal storage stockyard. Depending of the position of U Reclaimer 45, a specific sector of a horizontal storage facility will be activated to initiate the aeration of a sector and the reclaiming of product.

U Reclaimer 45 has winches and cylinders that have limit switches to indicate the position and inclination of Reclaimer Main Structure 1. A vibrating sensor wire assembled around Reclaimer Main Structure 1 indicates if U Reclaimer 45 is traveling too fast or if the reclaiming blades mounted on Reclaimer Chain 3 are too deep inside the product.

FIG. 2 is an isometric drawing of a Reclaimer Main Structure 1 which supports Reclaimer Chain 3 mounted with Scrapers 2. A Motor Structure 8 and Metal Plate 9 support a Hydraulic Direct Drive Motor 4 which couples to Sprocket 6 mounted on Motor Shaft 5. A Pillow Block Bearing 7 is shown mounted on Motor Shaft 5.

The purpose of a Reclaimer Main Structure 1 as shown in FIG. 2, a part of a U Reclaimer 45 of FIG. 1, is to hold in place all the components that will do the job of moving material by means of scraping material which is piled on the floor from a starting point to a collecting point through motive action of a Reclaimer Chain 3 fitted with Scrapers 2 of FIG. 2. All the components of this assembly are supported and protected by Reclaimer Main Structure 1. Once Hydraulic Direct Drive Motor 4 is turned on, this motor begins radial motion applying torque onto Motor Shaft 5 to provide torque to drive Sprocket 6 connected to Reclaimer Chain 3, thereby providing motion to Reclaimer Chain 3 which supports Scrapers 2 to move material.

FIG. 3 is a front plan view drawing of a Reclaimer Main Structure 1 supporting a Hydraulic Direct Drive Motor 4 mounted on Motor Structure 8 and Metal Plate 9. A plurality of Pillow Block Bearings 7 are shown mounted on Motor Shaft 5. A front view of Reclaimer Chain 3 is shown with Scrapers 2 mounted on Reclaimer Chain 3.

FIG. 2 and FIG. 3 show a Reclaimer Main Structure 1 which is constructed from either rectangular high strength steel tubing, or steel angles cut to length and welded. Other high strength materials can also provide a Reclaimer Main Structure 1 to support and house the shown components. An additional Motor Structure 8 is welded onto Reclaimer Main Structure 1, also made from high strength steel or similar high strength material. Metal Plate 9 is welded onto Reclaimer Main Structure 1. Both Motor Structure 8 and Metal Plate 9 house and support Hydraulic Direct Drive Motor 4. A Motor Shaft 5 is connected to Hydraulic Direct Drive Motor 4. A plurality of Pillow Block Bearings 7 provide support to Motor Shaft 5 and allow for circular motion of Motor Shaft 5 when in operation by Hydraulic Direct Drive Motor 4 providing torque to Motor Shaft 5. A Reclaimer Chain 3 is pre-fabricated of high strength steel or similar material and mounted on Sprocket 6 which is mounted on Motor Shaft 5 providing support and connecting to Reclaimer Chain 3 to provide torque to Reclaimer Chain 3 when in operation by Hydraulic Direct Drive Motor 4. Scrapers 2 are pre-fabricated onto Reclaimer Chain 3 to provide scraping means to move material when in operation.

FIG. 4 is an isometric drawing of a gantry frame structure of the U Reclaimer of the present invention. A gantry frame structure of the U Reclaimer 45 of FIG. 1 comprises a frame structure whose upper part includes two parallel Upper Girders 11 at opposite ends with diagonal and transverse Vertical Girders 12 for support. Steel Beams 13 attach to Upper Girders 11 to complete an upper gantry frame structure of the U Reclaimer 45 of FIG. 1. Supporting both parallel Upper Girders 11 are four total Vertical Girders 12 which are provided with pre-manufactured Motorized End Carriages 14, as shown two in total. A Geared Motor 17 is provided with the pre-manufactured Motorized End Carriages 14 provides motive power for the U Reclaimer 45 gantry's movement. A Cable Reel 15 is also shown in FIG. 4. A Hydraulic Power Unit 16 is shown mounted on a Motorized End Carriage 14.

FIG. 5 is a front view drawing of the gantry frame structure of the U Reclaimer of the present invention. Motorized End Carriage 14 comprises two Carriage Wheels 18 for directional motion of a gantry frame structure of the U Reclaimer 45 of FIG. 1. Also shown in FIG. 5 is a Motorized End Carriage 14 with Geared Motor 17. Vertical Girders 12 support Upper Girders 13 attached with Steel Beams 13. Cable Reel 15 is mounted on an Upper Girder 11.

The main structure of the gantry frame structure of the U Reclaimer 45 of FIG. 1 is constructed of several rolled steel Upper Girders 11, Vertical Girders 12, Steel Beams 13 bolted and welded into place as shown in FIG. 4 and FIG. 5. An upper part of the gantry frame structure comprises two Vertical Girders 11 bolted or welded into Vertical Girders 12. Four Vertical Girders 12 are bolted or welded into place into the bottom Motorized End Carriages 14.

FIG. 6 is a side view drawing of U Reclaimer 45 showing a side view of the isometric drawing of FIG. 1. A Gantry Frame Structure with a Suspension Assembly shown in FIG. 6 comprises four Main Hydraulic Cylinders 22 for movement, four Elevation Hydraulic Cylinders 21 on both sides of Gantry Frame Structure with a Suspension Assembly and two Hydraulic Pistons 29 parallel to Reclaimer Main Structure 1. Gantry Frame Structure with a Suspension Assembly can be lowered on both ends, vertically or diagonally to accomplish movement of material by the U Reclaimer 45, as previously disclosed in FIG. 1 and FIG. 2. Elevation Hydraulic Cylinders 21 control angular movement of Gantry Frame Structure with a Suspension Assembly. Main Hydraulic Cylinders 22 and Hydraulic Pistons 29 control axial movement of Gantry Frame Structure with a Suspension Assembly. The bottom connecting part of Main Hydraulic Cylinders 22 are attached to a Mechanical Brake System 27 shown in more detail in FIG. 7. Mechanical Brake System 27 is mounted on a Slotted Guide 24 inside of which is a V-Groove Wheel 25 which travels on an axial slot that allows movement of U Reclaimer 45.

FIG. 7 is a detailed isometric drawing of a Slotted Guide 24 showing a Mechanical Brake System 27 which is activated by Brake Hydraulic Piston 28 to stop axial movement of Main Hydraulic Cylinder 22 which is connected to V-Groove Wheel 25 which travels on an axial slot that allows movement of the U Reclaimer.

FIG. 8 is an isometric drawing of Gantry Frame Structure with a Suspension Assembly showing Hydraulic Cylinders Support 23, Main Hydraulic Cylinders 22, Elevation Hydraulic Cylinders 21, Slotted Guide 24, and High Strength Steel Frame 26.

Figure 9:
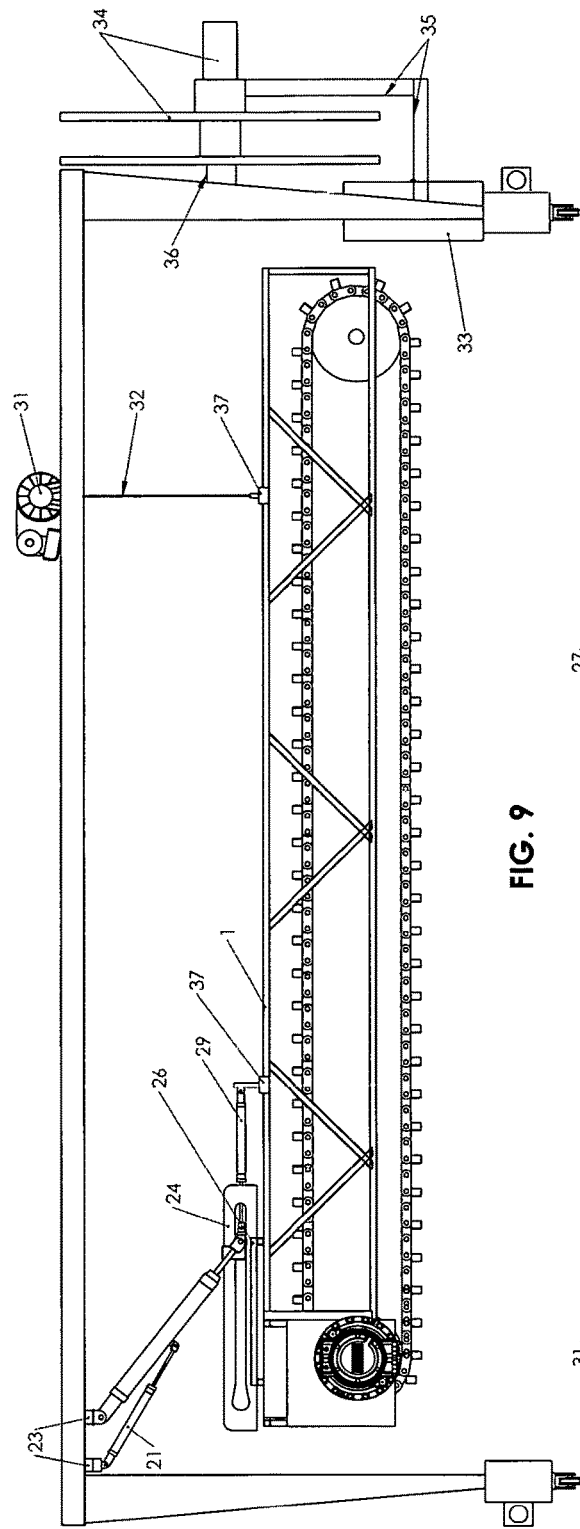
FIG. 9 is a side view drawing of U Reclaimer 45, which is a preferred embodiment of a U Reclaimer of the present invention, more clearly showing Gantry Frame Structure with a Suspension Assembly comprising two main components. One side being controlled by Main Hydraulic Cylinders 22 and Elevation Hydraulic Cylinders 21 and the other side being controlled by a Winch 31 suspended from a Steel Wire Cable 32. The suspension system can be lowered on both ends, vertically and diagonally. On one side, Elevation Hydraulic Cylinders 21 control angular movement while Main Hydraulic Cylinders 22 and Hydraulic Pistons 29 control axial movement. On the opposite side, Winch 31 controls the lowering and rising movement providing different angles for the reclaimer. In order to prevent any transversal movement of U Reclaimer 45, a Hydraulic Piston 29 is mounted to the main body of Mechanical Brake System 27 on the Main Hydraulic Cylinders 22 side. This Hydraulic Piston 29 will stop any transversal movement and auto corrects its position, with sensors involved, when Reclaimer Main Structure 1 is inclined. The bottom part of the Main Hydraulic Cylinder 22 is attached to a Mechanical Brake System 27 which will provide the clamping force to a Slotted Guide 24 to stop the U Reclaimer on the Main Hydraulic Cylinders 22 side. On one side of the Gantry Frame Structure with a Suspension Assembly, a pre-manufactured Motor Driven Cable Reel 34 is mounted on a Shaft 36 which is mounted on a Cable Reel Support Structure 25. This shaft will reel an electrical cable needed to power the system.

FIG. 9 is a side view drawing of U Reclaimer 45 which is a preferred embodiment of the present invention, a U Reclaimer 45, more clearly showing Gantry Frame Structure with a Suspension Assembly comprising two main components. One side being controlled by Main Hydraulic Cylinders 22 and Elevation Hydraulic Cylinders and the other side being controlled by a Winch 31 suspended from a Steel Wire Cable 32. The suspension system can be lowered on both ends, vertically and diagonally. On one side, Elevation Hydraulic Cylinders 21 control angular movement while Main Hydraulic Cylinders 22 and Hydraulic Pistons 29 control axial movement. On the opposite side, Winch 31 controls the lowering and rising movement providing different angles for the reclaimer. In order to prevent any transversal movement of U Reclaimer 45, a Hydraulic Piston 29 is mounted to the main body of Mechanical Brake System 27 on the Main Hydraulic Cylinders 22 side. This Hydraulic Piston 29 will stop any transversal movement and auto corrects its position, with sensors involved, when Reclaimer Main Structure 1 is inclined. The bottom part of the Main Hydraulic Cylinder 22 is attached to a Mechanical Brake System 27 which will provide the clamping force to a Slotted Guide 24 to stop the U Reclaimer on the Main Hydraulic Cylinders 22 side. On one side of the Gantry Frame Structure with a Suspension Assembly, a pre-manufactured Motor Driven Cable Reel 34 is mounted on a Shaft 36 which is mounted on a Cable Reel Support Structure 25. This shaft will reel an electrical cable needed to power the system.

Elevation Hydraulic Cylinders 21 and Main Hydraulic Cylinders 22 will be bolted on High Strength Steel Tubing 23 which will be either bolted or welded to Gantry Frame Structure with a Suspension Assembly. All Main Hydraulic Cylinders 22, Elevation Hydraulic Cylinders 21 and Hydraulic Pistons 29 will be pre-manufactured including the Hydraulic Brake Piston 28 for Mechanical Brake System 27 and Slotted Guide 24 will be manufactured from A36 steel. All of these components will be bolted or welded onto High Strength Steel Structure 26 which will be bolted or welded onto the Reclaimer Main Structure 1. A Winch 31 will be mounted on top of the Gantry Frame Structure with a Suspension Assembly frame. A Steel Wire Cable 32 provided with Winch 31 will be attached to Reclaimer Frame Mount thus holding the reclaimer structure on this side. Cable Reel Support Structure 35 will be bolted or welded onto Gantry Frame Structure with a Suspension Assembly frame. A pre-manufactured Motor Driven Cable Reel 34 will be inserted into a Shaft 36 which will be bolted or welded onto Cable Reel Support Structure 35.

Figure 10:
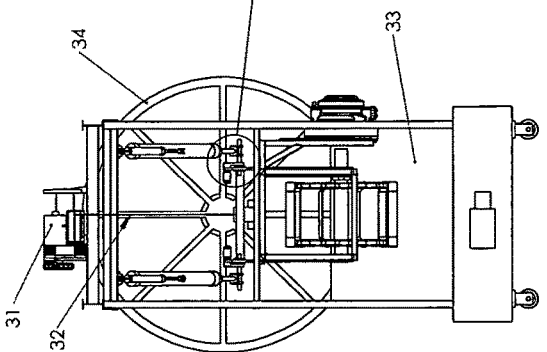
FIG. 10 is a front view of U Reclaimer 45 showing Winch 31, Motor Driven Cable Reel 34, Programmable Logic Controller at Panel 33, and Steel Wire Cable 32. This drawing shows the preferred embodiment of the present invention, a U Reclaimer 45.

FIG. 10 is a front view of U Reclaimer 45 showing Winch 31, Motor Driven Cable Reel 34, Programmable Logic Controller at Panel 33, and Steel Wire Cable 32. This configuration is a preferred embodiment of a U Reclaimer 45 of the present invention.

Figure 11:
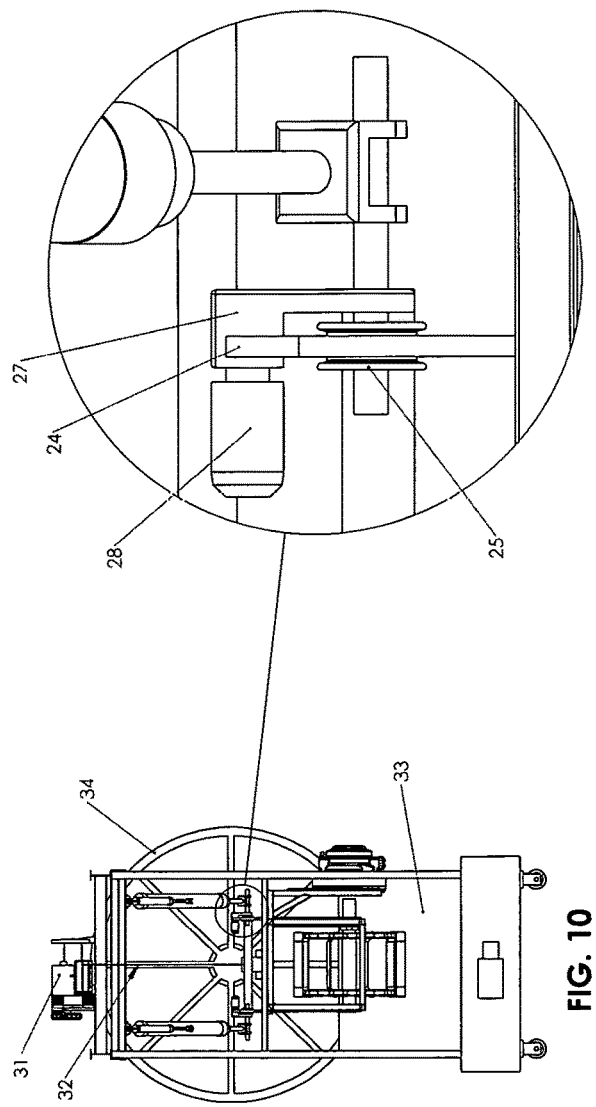
FIG. 11 is a detailed drawing showing Mechanical Brake System 27, Slotted Guide 24, Hydraulic Brake Piston 28 and V-Groove Wheel 25.

FIG. 11 is a detailed drawing showing Main Hydraulic cylinder 22, Mechanical Brake System 27, Slotted Guide 24, Hydraulic Brake Piston 28 and V-Groove Wheel 25.

Figure 12:
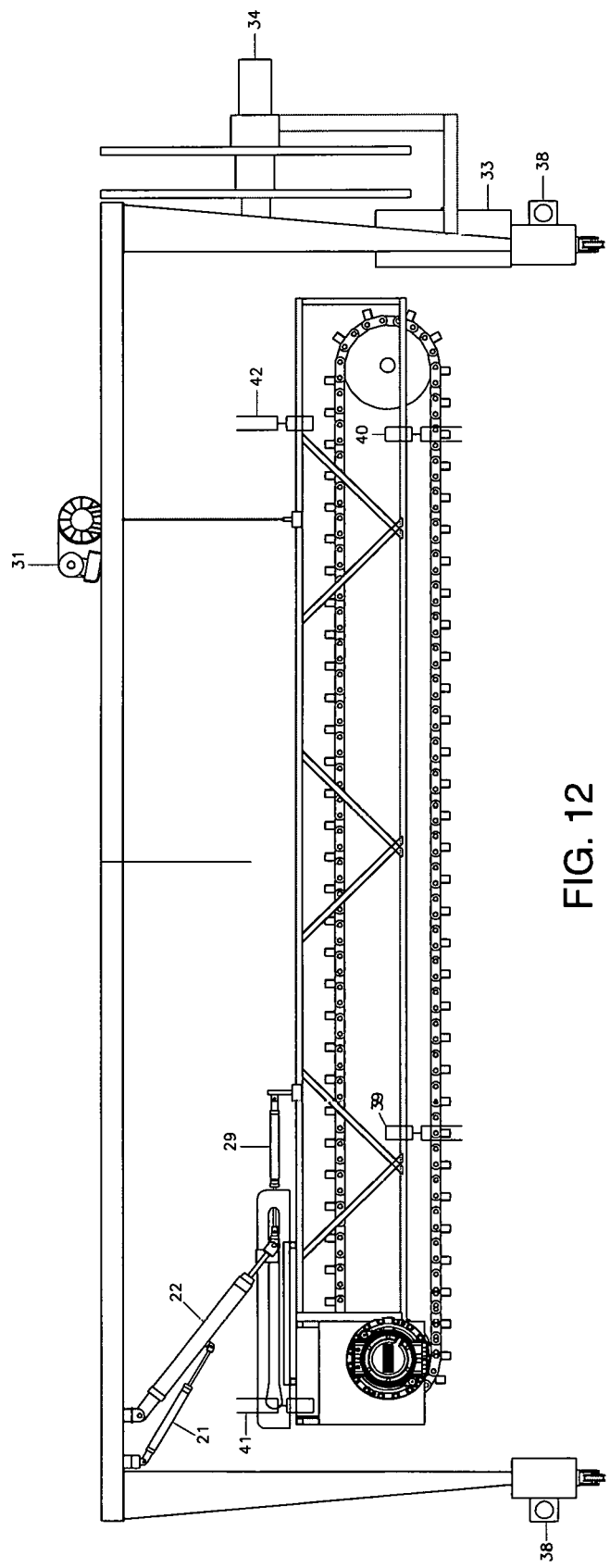
FIG. 12 is a side view drawing of U Reclaimer 45 showing Winch 31, Motor Driven Cable Reel 34, Motors with Encoders 38, Programmable Logic Controller at Panel 33, Elevation Hydraulic Cylinder 21, Main Hydraulic Cylinder 22, and Hydraulic Piston 29. Also shown are Electronic Level Switches with Vibratory Sensors 39, 40, 41, and 42.

FIG. 12 is a side view drawing of U Reclaimer 45 showing Winch 31, Motor Driven Cable Reel 34, Motors with Encoders 38, Programmable Logic Controller at Panel 33, Elevation Hydraulic Cylinder 21, Main Hydraulic Cylinder 22, and Hydraulic Piston 29. Also shown are Electronic Level Switches with Vibratory Sensors 39, 40, 41, and 42.

Figure 13:
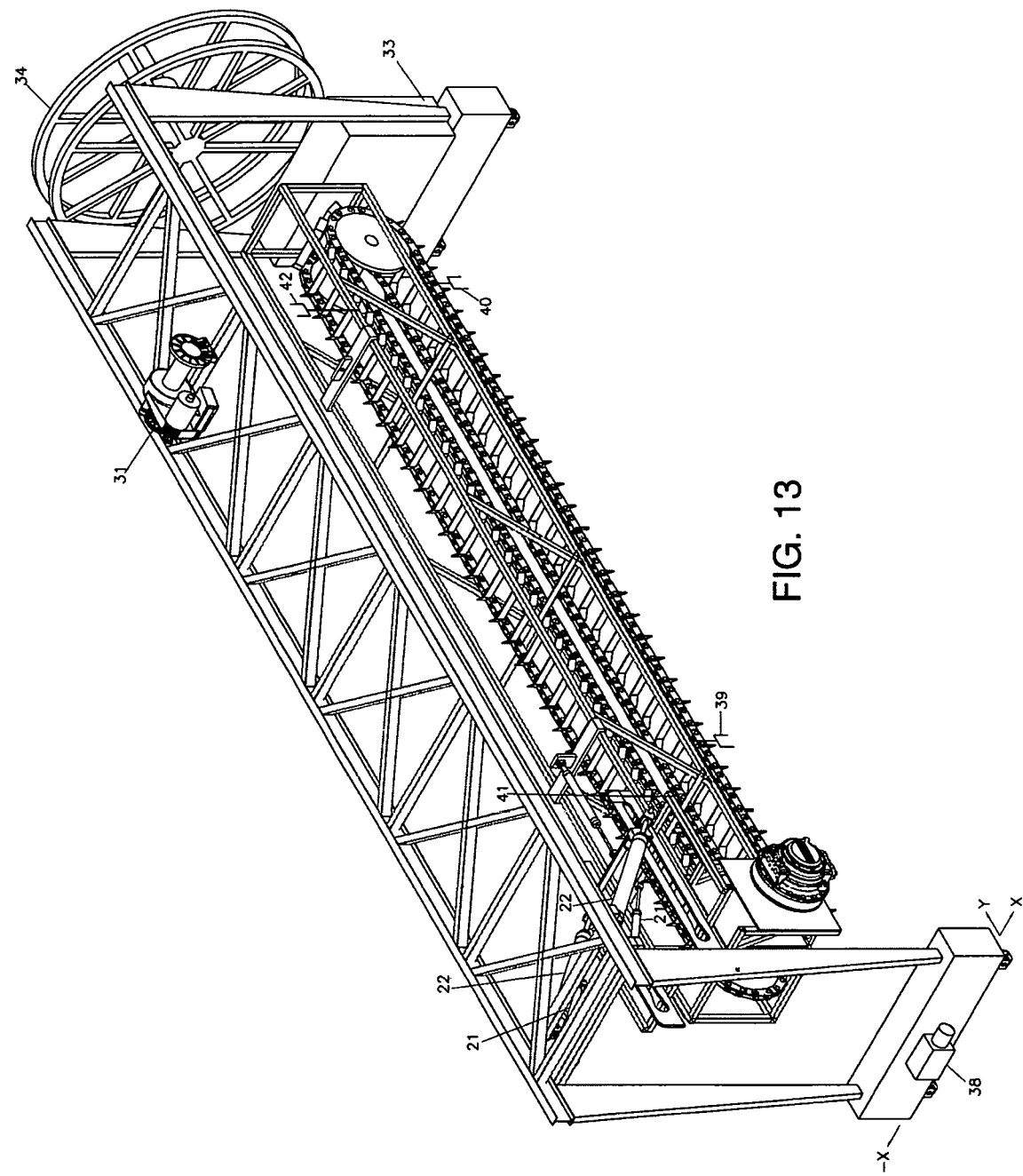
FIG. 13 is an isometric drawing showing U Reclaimer 45 to include electronic control components. Motors with Encoders 38 mounted on U Reclaimer 45 are provided with encoders that send a signal to a Programmable Logic Controller at Panel 33. At the same time, the Programmable Logic Controller is receiving the position of Motors with Encoders 38 at front and end of U Reclaimer 45 and activate a Cable Reel 34 in order to coil or un-coil a power cable that feeds Cable Reel 34. The logic programmed in the Programmable Logic Controller at Panel 33 will send signals to Cable Reel 34 rotation direction and speed depending on the position and speed of the Gantry Frame Structure Frame powered by Motors with Encoders 38.
Figure 14:
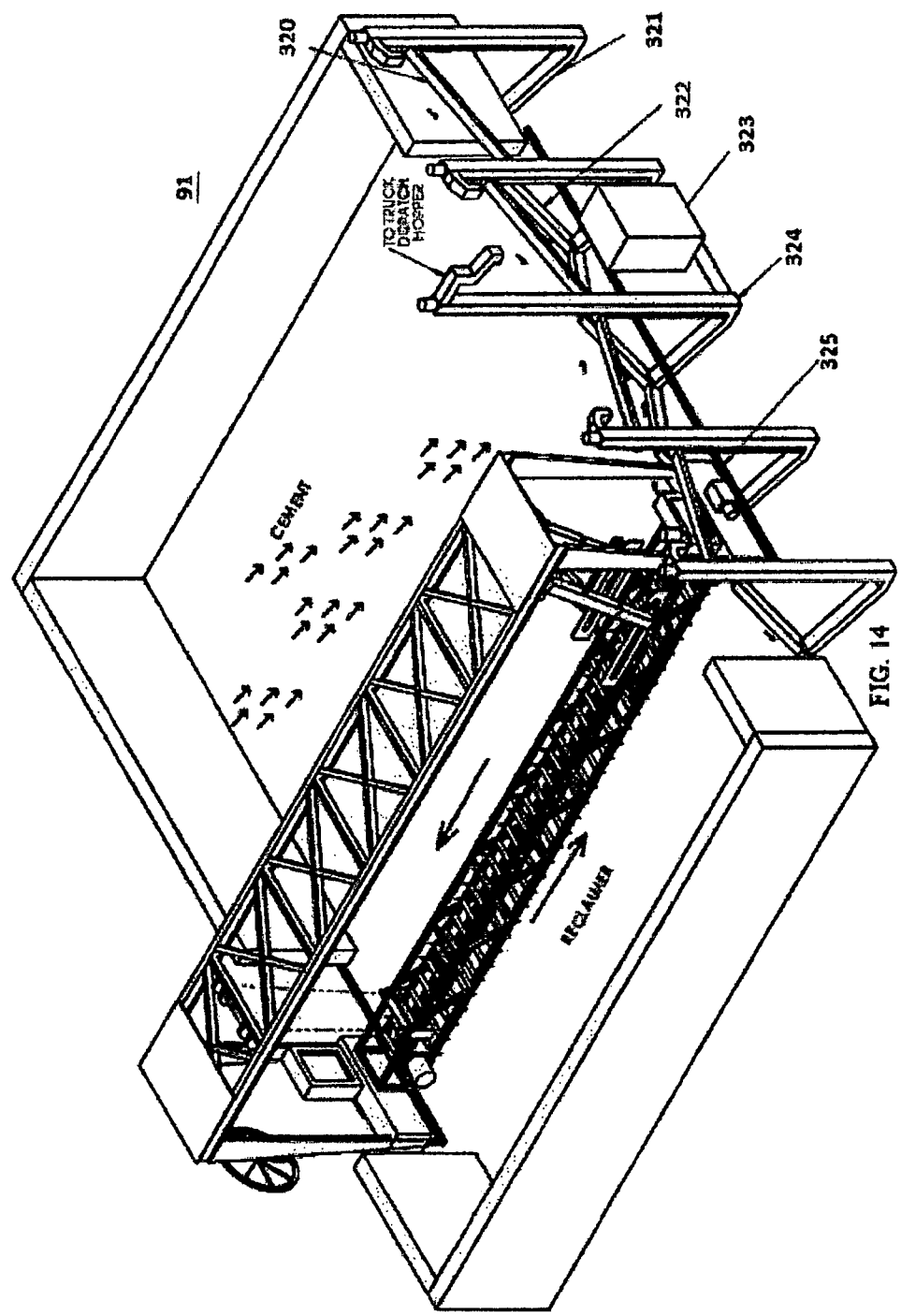
As shown in FIG. 14, an X-axis is noted for movement of U Reclaimer 45 through power provided by Motors with Encoders 38.
Figure 15:
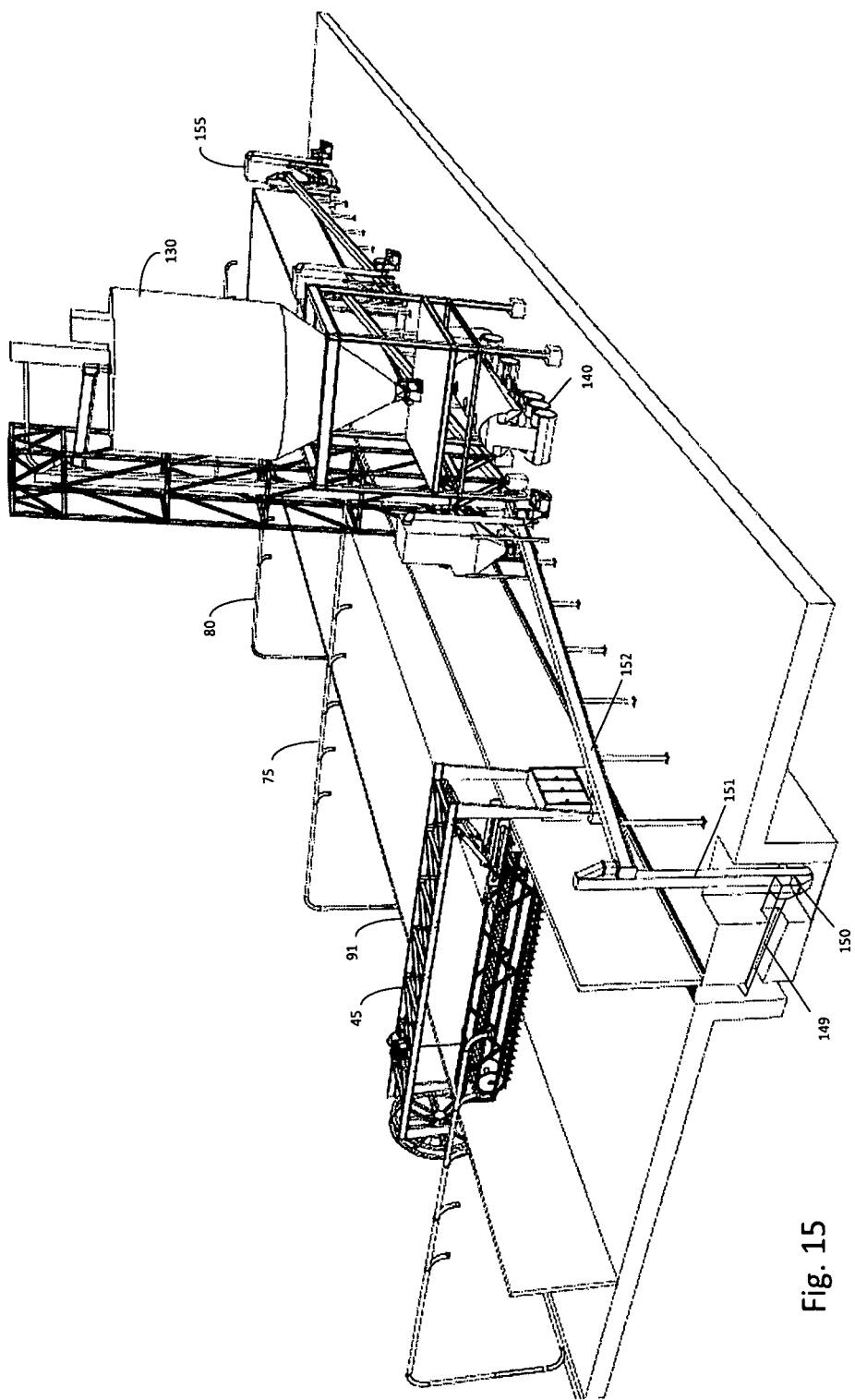
FIG. 15 is an isometric drawing of a horizontal cement storage system comprising a mechanical reclaimer 45, a cement delivery line 70 to deliver cement to a sector of a horizontal cement storage housing 91, a cement delivery line 80 to deliver cement to a second sector of the horizontal cement storage housing 91, also shown is an enclosed air slide 149 to deliver cement to screw conveyor 150 elevating cement to delivery hopper 130 to deliver cement to truck trailer 140, also shown is a plurality of dust collectors 155 to reclaim cement dust.

FIG. 13 is an isometric drawing showing U Reclaimer 45 to include electronic control components. Motors with Encoders 38 mounted on U Reclaimer 45 are provided with encoders that send a signal to a Programmable Logic Controller at Panel 33. At the same time, the Programmable Logic Controller at Panel 33 is receiving the position of Motors with Encoders 38 at front and end of U Reclaimer 45 and activate a Cable Reel 34 in order to coil or un-coil a power cable that feeds Cable Reel 34. The logic programmed in the Programmable Logic Controller at Panel 33 will send signals to Cable Reel 34 rotation direction and speed depending on the position and speed of the Gantry Frame Structure Frame powered by Motors with Encoders 38. As shown in FIG. 14, an X-axis is noted for movement of U Reclaimer 45 through power provided by Motors with Encoders 38.

FIG. 13 further shows an X & Y axis to note direction in these two axis. A further axis is a Z-axis which is basically vertical movement up and down of Reclaimer Main Structure 1 more aptly shown in FIG. 9. Winch 31 rotates and pulls Steel Wire Cable 32, shown more clearly in FIG. 9, to lift Reclaimer Main Structure 1 or uncoils Steel Wire Cable 32 to lower Reclaimer Main Structure 1. Winch 31 is provided with an electronic encoder that sends a signal to Programmable Logic Controller at Panel 33 to indicate Winch 31 position. Main Hydraulic Cylinders 22, Elevation Hydraulic Cylinders 21, and Hydraulic Pistons 29, more clearly shown in FIG. 9, are provided with linear rheostats that transmit their position to Programmable Logic Controller at Panel 33. Main Reclaimer Structure 1 can be positioned horizontally or inclined per signal commands from Programmable Logic Controller at Panel 33. Height of 13

Reclaimer Main Structure 1 is controlled by signals from Programmable Logic Controller at Panel 33 by activating Elevation Hydraulic Cylinders 21, Main Hydraulic Cylinders 22, and Hydraulic Pistons 29 and Winch 31. As shown in FIG. Reclaimer Main Structure 1 is also provided with four Electronic Level Switches with Vibratory Sensors 39, 40, 41, and 42 that detect end of stroke at lower level of Reclaimer Main Structure 1. As shown in FIG. 13, Electronic Level Switches with Vibratory Sensors 39 and 40 can be calibrated to limit depth of Reclaimer Main Structure 1 into a cement stock pile. Similarly, Electronic Level Switches with Vibratory Sensors 41 and 42 are limit switches at the upper position of Reclaimer Main Structure 1. All Electronic Level Switches with Vibratory Sensors 39, 40, 41, and 42 are hard wired to Programmable Logic Controller at Panel 33 which also controls the position of Elevation Hydraulic Cylinders 21, Main Hydraulic Cylinders 22, and Hydraulic Pistons 29 through hydraulic pressure.

FIG. 14 is an isometric drawing of a U Reclaimer 45 of the present invention in a horizontal cement storage facility showing enclosed air slide 320, enclosed air slide 321, open air slide 322, dust collector 323, screw conveyor 324, and rail 325 to allow movement of U Reclaimer 45 along horizontal storage housing 91 to reclaim cement stored within.

The present invention comprises a material reclaiming machine, more aptly named a U Reclaimer, for cement handling systems or similar materials and more particularly to a bulk cement storage system reclaiming device of the present invention, a U Reclaimer, for reclaiming of product from a cement horizontal storage facility or similar material horizontal storage facility. Reclaiming of cement once stored in horizontal storage is performed through use of a mechanical cement reclaiming machine, a U Reclaimer, of the present invention. Cascaded air slides are used to remove stored material recovered by a U Reclaimer as described further.

Either encoders or several limit switches have been arranged along the FACHS to indicate the position of the U reclaimer on the cement stockyard. Depending of the position of the U Reclaimer, a specific sector will be activated to initiate the aeration of a sector and the reclaiming of product.

The U Reclaimer's Gantry Frame Structure with a Suspension Assembly as described in the various Figures, further named a reclaiming arm of the U Reclaimer, comprises winches and cylinders which have limit switches to indicate the position and inclination of the reclaiming arm. A vibrating sensor wire assembled around the reclaiming arm, indicates if the U Reclaimer machine is traveling too fast or if the reclaiming blades are too deep inside the product.

The U Reclaimer is transported along the FACHS by means of a gantry drive motor which drives and positions the U Reclaimer's gantry assembly across the storage area along a Y-axis with motors controlled by a Motor Control Center located at a control room named MCC-2, an electric power cord motorized reel which extends and coils power cord back in depending on U Reclaimer's position along the tracks, is also operated by MCC-2, a hydraulic power unit which provides hydraulic power to winch and reclaiming arm, is also operated by this MCC-2, a hydraulic winch which lifts and positions reclaiming arm, controlled by MCC-2, a reclaimer arm hydraulic motor which drives the chain of the reclaiming arm to convey cement from stock pile to open aeroslides moving over X-axis, is also controlled by MCC-2, an inclinometer transmitter which indicates two axis position and inclination of reclaimer, is controlled by MCC-2, a gantry motor control center which is a slave power distribution and control enclosure mounted on the gantry and includes PLC and communications gateway, a field control transceiver which is a remote real time RF communication control system, a Differential Pressure (DP) level switch which is a vibratory sensor switch which detects bulk cement level presence to limit reclaimer's dipping parameter, are controlled by a separate Motor Control Center located at a control room named MCC-1, a CCTV system mounted on the U Reclaimer is a video camera mounted the frame of the U Reclaimer transmits video to MCC-1 located at a control room, a wireless stockpile level switch which is a vibratory sensor switch mounted on top of a retaining wall of a horizontal storage to detect bulk cement to control bedding stockpile level via a pneumatic stacking system, controlled by MCC-1, a one way stacking valve which is pneumatically actuated and diverts cement to a stacking sub sector, or in case of central sector, cement can be diverted to discharge directly on the dispatch hopper, controlled by a programmable controller named I/O-1, a two way stacking valve which is a pneumatically valve to actuate to divert cement to required stacking sector, controlled by I/O-1, an open aeroslide valve is pneumatically actuated and actuates an open aeroslide that conveys bulk cement from the U reclaimer to a vertical screw conveyor, an enclosed aeroslide then conveys bulk cement from the vertical screw conveyor to an adjacent downstream vertical screw conveyor, an enclosed aeroslide flow control valve which is a motorized gate valve to control flow of cement being fed to the enclosed aeroslide, controlled by MCC-1, and a vertical screw conveyor which conveys cement vertically and discharges it by gravity to a central screw conveyor which feeds the truck loading dispatch hopper, controlled by MCC-1.

A Main Motor Control Center is located at a control room which is a master power distribution and control center which also includes a SCADA system, a main control transceiver which is a main real time Radio Frequency (RF) communication control system, and a field control transceiver which is a remote real time RF communication control system.

Automation in the dispatch area of the FACHS comprises a field control transceiver which is a remote real time RF communication control system, a vertical screw conveyor which conveys cement vertically and discharges it by gravity to a central screw conveyor which feeds a truck loading dispatch hopper, a dispatch system Motor Control Center which is a slave-power distribution and control enclosure on dispatch area which includes PLC and communication gateway interlocks with MCC-1, a dispatch hopper dust collector which is a control system which is interlocked with main motor control center MCC-1 as permissive to operate load/discharge of dispatch hopper, a hopper level limit switch which is a hi-hi and low-low vibratory sensor switches to limit required filling levels, controlled by the dispatch system Motor Control Center, a hopper air blower which provides air to operate hopper's aerated cone on discharge mode, a one way cone activating valve which is pneumatically actuated to activate an aerated cone, a hopper gate valve which feeds an enclosed aeroslide operated, a stacker enclosed aeroslide which conveys bulk cement from dispatch hopper to truck loader, an air fan which provides air flow to the dispatch hopper's aeroslide system, a truck loader which is self-contained equipment interlocked with the dispatch hopper's discharge system with data handled by a SCADA system on MCC-1 in a control room, and a truck scale which is self-contained equipment interlocked with hopper discharge aerated cone and scale, also controlled by the dispatch system Motor Control Center.

A Fully Automated Cement Horizontal Storage (FACHS) is herein described by the various drawings FIG. 1 through FIG. 14 for storing large amounts of cement or cementitious materials in horizontal warehouses. Materials which have a consistency similar to cement are adaptable for the use of the present invention. This innovative system allows use of existing warehouses and enclosures on ports and plants, avoiding the expensive construction of either vertical concrete or steel silos. The operation of the FACHS, from the stacking of cement up to the reclaiming and dispatching of the product is completely automatic, requiring a minimum of personnel to operate the facility. All equipment employed for operation of the FACHS can be easily adapted to any specific site condition. The dimensions and capacity of all the main FACHS components depend on the available space, dimensions of the existing building, the required amount of product to be stored, and the required dispatch capacity.

Among the main characteristics and advantages of the FACHS system and method are the following:
  i. Use of a standard warehouse building, with minimal modifications or civil works.
  ii. a FACHS system and method is designed by introducing two innovative components, the U Cement Reclaimer and a Cascade Cement Distribution system.
  iii. Low Material storage height.
  iv. Stacking and reclaiming of product is fully automatic.
  v. Flexible to install and dismantle, requiring a minimum time and investment to put in operation.
  vi. Designed to hold capacities from 1,000 to 65,000 Tons of cement, ideally around 15,000 Ton of product.
  vii. It can be used to store several products other than cement, with similar consistency.
  viii. Stacking of product may be performed either pneumatically, mechanically or a combination of both systems.
  ix. The FACHS system and method allows the handling of multiple cement qualities.
  x. The FACHS system and method eliminates the dangerous operation of front loaders inside a flat horizontal storage.
  xi. The FACHS system is designed to handle capacities up 300 tons per hour for receiving and dispatching cement.

Applications of the FACHS system and method:
  i. The FACHS system and method is adaptable for import marine terminals, in combination with a pneumatic or mechanical ship unloader, with either a pneumatic screw pump or blow pump.
  ii. The FACHS is designed for quick installation and dismantling. The pneumatic conveying pipe to stack the cement inside the FACHS may be fixed or removable.
  iii. Further, the required civil works for the operation of the FACHS system and method are relatively straightforward. Concrete retaining walls may be prefabricated, which may be removed whenever it is needed.
  iv. After finishing the use of a FACHS system and method, all major equipment can be quickly dismantled and moved to a new location.

The FACHS system and method is designed based on the following premises:
a) Flexibility
  The FACHS system and method is easily expandable to store and handle large amounts and multiple types of cement and cementitious materials.

b) Short Return on Investment and Low Operation Cost
  i. The FACHS system and method makes optimal use of existing infrastructure.
  ii. A minimum of personnel is required to operate a FACHS system and method.
c) Short Realization Time
  i. It is possible to use brownfield sites with existing (partial) permits.
  ii. It is possible to use an existing storage facility.

Apparatus Components of an FACHS System and Method:
a) Stacking Equipment
  i. Pneumatic equipment (either screw pump or blow pump). Stacking of cement may be performed using mechanical equipment or a combination of a pneumatic and mechanical equipment.
  ii. Conveying pipe. The conveying line will be estimated based on the conveying capacity and distance to be conveyed.
  iii. Two-ways Valves (one for each sector).
  iv. Pneumatic butterfly valves (two for each outlet).
b) Reclaiming System
  i. Cement U reclaimer.
  ii. Open aeroslides, including steel support structure, aeration pipe, one manual ball valve for each 3 meters of aeroslide section, and two pneumatic butterfly valves for each sector.
  iii. Two aeration blowers for aeration of open aeroslides.
  iv. Vertical screw conveyors or bucket elevators (one for each sector).
  v. Transition enclosed aeroslides from open aeroslide to screw conveyor or bucket elevator (one for each sector).
  vi. Slide gates (one for each sector).
  vii. On-off flow control gate (one for each sector).
  viii. Enclosed aeroslide to convey cement from each sector to a dispatch system.
  ix. Aeration fans for enclosed aeroslides (one for each sector).
c) Dispatch System
  i. Cement Hopper with the following accessories: aeration bottom with aeration pipe and blower, safety valve, dust collector, level indicators (high and high-high), safety valves, inspection hatch, baffer box to connect pneumatic conveying line, loading cells, steel support structure, access ladder and handrails. The capacity of the cement hopper may vary depending on the dispatch requirements.
  ii. Silo slide gate.
  iii. Aeroslide slide gate, flow control gate for regulation and flow control gate on-off and enclosed aeroslide.
  iv. Loading spout.
  v. Dispatch system to include installation of an optional packing unit.
  vi. Dispatch system may be mobile; however, this reduces the delivery hopper capacity to a maximum of 200 tons. To facilitate accurate flow control of the dispatch system, air slides were designed with computer controlled flow control gates. One flow control gate is installed at the discharge of a delivery cement hopper to control the flow rate and another flow control gate at the discharge end of an enclosed air slide to stop flow when a desired weight is attained. Operation is as follows:
    i. first a flow control gate at the discharge end of the air slide opens allowing cement to flow from the air slide into the delivery spout.

ii. Next, a flow control gate at the upper end of the air slide opens to allow the desired flow rate. When the truck trailer is 85% full the flow control gate closes from 90% to 30%.

iii. Finally, at about 300 pounds of a full load, both gates close. This offset is necessary since suspended dust contained in the spout and spout dust collector will come to rest in the trailer. Since cement flow rate changes with gate settings, temperature, moisture content and flow characteristics, the point at which the gates close must be adjustable.

To assure that truck loading is of correct weight, on scale loading is used to determine how much cement is in the trailer as it is being loaded. On scale loading requires that a truck be completely on a scale and stopped before and during the loading operation. A computer controls the loading operation. Once a truck is stopped on the scale, a spout computer is programmed from a loadout computer what type of truck and how many hatches are to be filled. Transaction data is stored in a loadout computer until the loading is complete and then is sent to a shipping server.

d) Ancillary Equipment and Control System:
i. Service compressor, including compressed air piping.
ii. Bag house, including dedusting pipe and return screw conveyor and rotary valve.
iii. MCC and HMI control system.

e) Computer Control Apparatus of an FACHS System and Method:
  i. Computers used in the Fully Automated Cement Horizontal Storage System perform both sequential control and feedback control. Programmable logic controllers are also used in the FACHS system and method as a dedicated microprocessor that replaces hardware components such as timers and drum sequencers used in relay logic type systems. Process control computers process data from network PLC's, instruments and controllers to implement PID control of many individual variables in the FACHS system and method.
  ii. Programmable logic controllers (PLC's) use a processing system to allow for variation of control of inputs and outputs from the various components of the FACHS system. PLC's make use of programmable memory, storing instructions and functions like logic, sequencing, timing, etc. A PLC receives a variety of inputs and returns a variety of logical outputs, the input devices being sensors and output devices being motors, valves, etc. PLC's are optimized for control task and use in the FACHS system.
  iii. A Distributed Control configuration is used to control the FACHS system where controllers are distributed throughout the system.
  iv. The FACHS automation structure is comprised of field device instrumentation, programmable logic controllers (PLC's), and a process control computer that processes data from the various PLC's to output logical sequencing to motors and valves comprising the FACHS system and method of the present invention. The various logic levels used are the following:
    a. Level 1 is comprised of the various devices and sensors which represent the state of the cement loading or reclaiming process. These devices are switches indicating the position of dampers, gates, or instrumentation devices.
    b. Level 2 is comprised of nodes collecting the Level 1 plant information, grouping into related areas and taking logical actions based on this information.
    c. Level 3 is a combination of process operations in the FACHS system.

Level 1 instruments are integrated with a fieldbus on the same controller. The implementation of fieldbus for level 1 device integration helps reduce control cabling during control implementation. It also enables a remote configuration of these devices from an integrated control station.

The concept of fieldbus integration is extended to more complex electrical devices like AC drives, MCC and MV switchgear. By establishing fieldbus communication with the MCC and a main computer CPU avoids a need of large control cabling, which otherwise would be required.

Operation of an FACHS System and Method:
  i. Stacking of Cement

The cement is stored between four walls of concrete. The storage volume between the concrete walls, as well as the height, width and length of each concrete wall depends on the building height and the total capacity of the cement to be stored. In order to guarantee the evenly distribution of the product between the walls, the total length of the storage area is divided in several sectors, as necessary to cover the entire volume of the stockyard. Each sector is fed by either a pneumatic line with several outlets arranged transversally (between 5 and 4 outlets). Each outlet is open and close by means of two (2) pneumatic operated butterfly valves. The distribution of product to each sector is achieved by means of pneumatic two-way valves, located outside the building. Several limit switches are installed longitudinally on the retaining walls (one for each sector). The limit switches provide a signal to the control room to automatically open and close the pneumatic butterfly valve of a specific outlet and/or to open and close a specific two-way valve of the sector that will be filled with cement.

When the product is being stacked the U reclaimer will remain outside the flat storage. It is possible to dispatch cement simultaneously with the stacking of product, by pumping cement directly to the cement hopper, bypassing the flat storage.

ii. Reclaiming of Cement

Additional to the concrete walls, a concrete trench of 800 mm wide is built adjacent to one of the longitudinal concrete walls. The height of each trench will depend on the length of each sector. The height of the trench is estimated by dividing the length of the trench by two and then multiplying this value by the tangent of 5°. Inside the trench there will be installed an open aeroslide of 750 mm wide which will be used to reclaim the cement. Each aeroslide will be inclined 5° towards the center of each sector. The open aeroslides are supported by steel structures anchored to the concrete floor. Two identical blowers are used to aerate each open aeroslide sector. The aeration capacity of the blowers is calculated by multiplying 750 mm by the length of each sector divided by 3. This value is then multiplied by 1.5 $m^3/m^2$-min. Each open aeroslide is activated automatically depending on the location of the Cement U Reclaimer 45 as shown in FIG. 2. Each sector has a manual valve on each section of 3 m open aeroslide, and a pneumatic valve which is automatically operated when a specific sector needs to be aerated.

Cement will be reclaimed by activating (aerating) the open aeroslides of a specific sector, located adjacent to one of the longitudinal retaining walls, in combination with a mechanical reclaimer. The difference of pressure created when an open aeroslide is activated, produces that the material on the top of the open aeroslide will fall towards the center of each sector. The U reclaimer will then keep feeding material towards the open aeroslide of the activated sector. Each sector is activated automatically depending on the position along the FACHS of the U reclaimer. The position of the U Reclaimer is monitored by either encoders or several limit switches arranged along the traveling pad of the U reclaimer. These limit switches will send a signal to the control room, indicating the position of the U reclaimer, activating the sector where the reclaimer is located at.

Once the material above the open aeroslides has been reclaimed, then the U reclaimer start pushing material towards the open aeroslides. The U reclaimer starts reclaiming of product from the top of the pile, slicing a section of the pile. The reclaiming arm is lowered as long as the product is being reclaimed. The reclaiming arm may work in angle, above the angle of repose of cement (30°) to facilitate the reclaiming operations. Once the product of one layer has been totally reclaimed, then the reclaiming arm is raised and the gantry travels to reclaim a next slice of the pile. This procedure is repeated to complete the reclaiming of the pile.

iii. U Reclaimer of the FACT IS System and Method

The U reclaimer comprises a gantry structure supporting a reclaiming arm. The main features of the U reclaimer are described as follows:

a) Travelling

The gantry travels along the FACHS by means of either rails, arranged along outside the longitudinal walls, or rubber tires. Two electrical motors on each side of the gantry, rotating at the same speed move the gantry along the FACHS. The speed of the U reclaimer is fixed. A vibrating sensor attached on a reclaiming arm indicates if the gantry is traveling too fast or if the reclaiming arm is too deep inside the product, reducing the speed of the machine, and adjusting the height of the reclaiming arm.

b) Cable Reel

An electrical driven cable reel has been arranged on one of the sides of the gantry. The main power supply cable will be located on the center of the FACHS, pivoting to either side depending on the position of the U reclaimer. The cable reel motor works in synchronization with the traveling motors.

c) Hydraulic Pump

A hydraulic pump has been arranged to one of the sides of the gantry. All movable components that are in direct contact with the product, such as the reclaiming arm which and the reclaiming chain will be preferably driven by means of either hydraulic motors or hydraulic cylinders. However, these components may also be driven using electrical motors.

d) Reclaiming Arm Hydraulic Cylinders

The reclaiming arm is lowered and lifted by means of hydraulic winches, hydraulic cylinders and a combination of both systems. The reclaiming arm may work inclined towards the open aeroslide to facilitate the product reclaiming operation. Depending on the width of the stockyard, it may be necessary to add secondary reclaiming arms.

e) Reclaiming Arm

A reclaiming chain operated by means of a hydraulic motor pushes the material towards the an open aeroslide of each sector. The reclaiming arm has blades attached to a reclaiming chain. The chain runs on channels and has two sprockets on each side of the arm. Four or two hydraulic cylinders are attached to the side of the reclaiming arm and to the top of the gantry to avoid the transversal and longitudinal movement of the arm when the material is being pushed or when the machine touches the side of the pile.

f) Limit Switches and Control i. The U reclaimer is fully automated. However, the initial positioning of the machine must be performed by an operator using a remote control. Once the machine has been positioned at the beginning of the pile, then the U reclaimer can work completely in automatic mode.

ii. Either encoders or several limit switches have been arranged along the FACHS to indicate the position of the U reclaimer on the stockyard. Depending of the position of the machine, a specific sector will be activated to initiate the aeration of a sector and the reclaiming of product.

iii. The reclaiming arm winches and cylinders have limit switches to indicate the position and inclination of the reclaiming arm.

iv. Vibrating sensor wire arranges around the reclaiming arm, indicates if the machine is traveling too fast or if the reclaiming blades are too deep inside the product.

iv. Cascade Cement Distribution Arrangement

The cement or bulk material is conveyed by open aeroslides to the center of each sector to an enclosed aeroslide. Each enclosed aeroslide has a manual slide gate and an On-Off flow control gate electrically operated. The enclosed aeroslide, the slide gates and the on-off flow control gate are aerated by a blower assigned to the sector that is being activated. The enclosed aeroslide feeds either a screw conveyor or a bucket elevator. Except for the central sector, which feeds directly the dispatch hopper, the screw conveyor or bucket elevator will convey the cement to an enclosed aeroslide. The enclosed aeroslides of the sectors adjacent to the dispatch hopper discharge the product directly to the bottom of a dispatch hopper feeding screw conveyor or bucket elevator. While the enclose aeroslides of the sectors located farthest from the dispatch hopper feed the screw conveyor or bucket elevator of the adjacent sector. This system has been named Cascade Cement Distribution Arrangement, and it has been designed specifically for the operation of the FACHS to reduce the height of the screw conveyor or bucket elevators of the sectors located farther away from the dispatch hopper.

v. Dispatch Area

The dispatch area is composed of a buffer hopper or silo with enough capacity to guarantee the continuous dispatch of cement from the terminal. The buffer hopper has an aerated cone, a slide gate, and discharge the product to an enclosed aeroslide. The discharge system has a manual slide gate, a flow control gate and an On-off flow control gate. The trucks are loaded by means of a retractable loading spout with a level limit switch. The buffer hopper is supported by load cells, to keep track of the tonnage being dispatched. Inside the buffer hopper, there will be two level indicators for high and high-high level of product. The material may be conveyed directly to a surge bin without passing through the flat storage. For this purpose, a baffer box has been installed to reduce the speed of material. The buffer hopper also has a safety valve, as well as a Dust collector.

vi. Ancillary Equipment a. Dust Collector

The FACHS is supplied with the necessary dust collecting system to guarantee the proper control of dust at the transfer points and dissipation of air wherever it is required. The dust collectors are calculated based on the air generated by the air compressors, blowers and fans.

b. Service Compressed Plant

An air compressed unit will be supplied for the operation of all pneumatic valves, and cleaning of dust collectors.

c. Control Room

The FACHS is supplied with the necessary MCC cabinets for all electrical motors, as well as HMI to control the operation of the stacking, reclaiming and dispatching of cement.

vii. Advantages of an FACHS System and Method i. The FACHS is an option to automatically store, reclaim and dispatch large amount of cement or cementitious materials, using horizontal warehouses.

ii. The FACHS allows to reclaim the cement from the storage area without the dangerous practice of using an operator inside a front loader.

iii. The FACHS substantially reduces the number of aeration pads inside a flat storage to perform the reclaiming of cement, and consequently the energy consumption.

iv. FACHS introduces two new concepts to reclaim cement inside a flat storage system: The U Cement Reclaimer and The Cascade Cement Distribution Arrangement. These two new components, together with the traditional pneumatic conveying system for stacking cement, the open aeration pads to reclaim the cement from a flat warehouse, and the typical dispatch system, has been integrated to create an efficient Fully Automated Cement Horizontal Storage to handle large quantities of cement. If the strength of the building's columns allows it, the travelling rails for the gantry supports may be installed directly attached to the building columns or the gantry rails may be installed on the top of the side retaining walls if the concrete retaining walls are designed with the necessary strength to support the dynamic and static loads resulting from the gantry operation.

What is claimed is:

1. A Fully Automated Cement Horizontal Storage method for storing and reclaiming cement or bulk material in a horizontal storage with a plurality of storage sectors comprising the steps of:

delivering cement or bulk material to the horizontal storage by delivery lines;

stacking the cement or bulk material in the horizontal storage between walls of concrete forming the plurality of sectors within the horizontal storage for even distribution of cement or bulk material;

providing the horizontal storage with open and enclosed cement or bulk material aeroslides;

providing a cascade cement or bulk material distribution for even distribution of cement or bulk material;

providing a cement or bulk material moveable mechanical reclaimer comprising a rotating reclaimer main structure;

moving the mechanical reclaimer with wheels along the horizontal storage by mechanical means;

providing blades on the reclaimer main structure, the reclaimer main structure to rotate by mechanical means;

reclaiming of the cement or bulk material from the horizontal storage by rotating the reclaimer main structure thereby engaging the blades with the cement or bulk material and moving said cement or bulk material to the aeroslides;

providing a cement or bulk material dispatch area to receive the reclaimed cement or bulk material from the aeroslides;

dispatching of the cement or bulk material from the dispatch area unto truck trailers; and providing automation means for the stacking of cement or bulk material, the reclaiming of cement or bulk material, and the dispatching of cement or bulk material from the horizontal storage.

2. The Fully Automated Cement Horizontal Storage method of claim 1 wherein stacking of cement or bulk material in a horizontal storage between walls of concrete comprises dividing the horizontal storage into sectors for even distribution of cement or bulk material to be supplied by cement or bulk material delivery lines to each sector with several outlets arranged in the delivery lines, with each outlet provided with pneumatic operated butterfly valves which open and close to achieve even distribution of cement or bulk material to each sector, the distribution of bulk material to each sector is achieved by opening and closing of pneumatic two-way valves, located outside the horizontal storage, the opening and closing of the pneumatic two-way valves is achieved by activation by a plurality of limit switches, one for each sector, the limit switches provide a signal to a control room to automatically open and close the pneumatic valve of a specific sector that will be filled with cement or bulk material.

3. The Fully Automated Horizontal Cement Horizontal storage method of claim 1 wherein providing the horizontal storage with open and enclosed material moving aeroslides comprises forming a plurality of concrete trenches of 800 mm wide in each sector of the horizontal storage built adjacent to one of the longitudinal concrete walls of the sector, the height of each trench will depend on the length of each sector, the height of the trench is estimated by dividing the length of the trench by two and then multiplying this value by the tangent of 5°, inside the trench there will be installed an open aeroslide, comprising a steel sheet of 750 mm wide with sides formed to the trench height with a lop cover of perforated steel sheet which will be used to reclaim cement or bulk material, each aeroslide is inclined 5° towards the center of each sector, two identical blowers are used to aerate a plurality of open aeroslides in each sector for movement of cement or bulk material, the aeration capacity of the blowers is calculated by multiplying 750 mm by the length of each sector divided by 3, this value is then multiplied by $1.5 \, m^3/m^2$-min, each open aeroslide is aerated automatically depending on the location of the cement or bulk material mechanical reclaimer.

4. The Fully Automated Cement Horizontal Storage method of claim 1 wherein providing a cascade cement or bulk material of even distribution comprises conveying cement or bulk material by open aeroslides to the center of each sector of a horizontal storage, further conveying the cement or bulk material to an enclosed aeroslide, the enclosed aeroslide is formed either of rectangular closed metal sheet or tubular metal sheet, each enclosed aeroslide has a manual slide gate and an on-off flow control gate which is electrically operated, the enclosed aeroslide, the slide gates and the on-off flow control gate are aerated by a blower installed at the sector that is being activated, the enclosed aeroslide feeds either a screw conveyor or a bucket elevator, except for the central sector, which feeds directly into the dispatch hopper, the screw conveyor or bucket elevator will then convey the cement to a second enclosed aeroslide, the enclosed aeroslides of the sectors adjacent to the dispatch hopper discharge the bulk material directly to the bottom of the dispatch hopper, while the enclosed aeroslides of the sectors located farthest from the dispatch hopper feed a screw conveyor or bucket elevator of an adjacent sector, thereby creating a Cascade Cement Distribution Arrangement, designed specifically for the operation of the Fully Automated Cement Horizontal Storage to reduce the height of the screw conveyor or bucket elevators of the sectors located farther away from the dispatch hopper.

5. The Fully Automated Cement Horizontal Storage method of claim 1 wherein reclaiming of cement from a horizontal storage comprises aerating a first open aeroslide of a specific sector, located adjacent to one of the horizontal storage walls, in combination with operation of the mechanical reclaimer, the difference of pressure created when an open aeroslide is aerated produces that the material on the top of the open aeroslide will fall towards the center of the sector, the mechanical reclaimer, through rotating of its reclaimer main structure with blades will then keep feeding material towards a second open aeroslide on the opposite end of the sector, each sector is activated automatically depending on the position along the horizontal storage of the mechanical reclaimer, the position of the mechanical reclaimer is monitored by a plurality of encoders and limit switches arranged along the traveling pad of the mechanical reclaimer these encoders and limit switches will send a signal to the control room, indicating the position of the mechanical reclaimer, activating the sector where the mechanical reclaimer is located the mechanical reclaimer starts reclaiming of bulk material from the top of the pile, slicing a section of the pile, the reclaiming main structure of the mechanical reclaimer is lowered into the cement or bulk material being reclaimed, the reclaiming main structure may work at an angle, above the angle of repose of cement(30°) to facilitate the reclaiming operations, once the bulk material of one layer has been totally reclaimed, then the reclaimer main structure is raised and the mechanical reclaimer travels to reclaim a next slice of the pile of cement or bulk material, this procedure is repeated to complete the reclaiming of the pile of cement or bulk material.

6. The Fully Automated Cement Horizontal Storage method of claim 1 wherein providing a dispatch area comprises providing a buffer hopper or silo with enough capacity to guarantee the continuous dispatch of cement or bulk material from the horizontal storage, the buffer hopper comprising an aerated cone, a slide gate, and an enclosed aeroslide, a flow control gate, an on-off flow control gate, the buffer hopper further comprising a retractable loading spout with a level limit switch, the retractable loading spout to load transport trucks, the buffer hopper is supported by load cells, to keep track of the cement or bulk material being dispatched inside the buffer hopper are two level indicators for high and high-high level of bulk material, the high-high level to indicate when the cement or bulk material is to be conveyed directly to a surge bin.

7. The Fully Automated Cement Horizontal Storage method of claim 1 wherein dispatching of bulk material from the Fully Automated Horizontal Storage comprises providing accurate flow control of the cement or bulk material dispatch system by providing air slides designed with computer controlled flow control gates, one flow control gate is installed at the discharge of a delivery cement or bulk material hopper to control cement or bulk material flow rate and a second flow control gate at the discharge end of an enclosed air slide to stop flow when a desired weight is attained, dispatching of cement or bulk material comprises the following steps:
opening a first flow control gate at the discharge end of a discharge air slide allowing cement to flow from the air slide into a delivery spout;
opening a second flow control gate at the upper end of the discharge air slide to allow the desired flow rate of cement or bulk material into a truck trailer, when the truck trailer is 85% full the flow control gate closes from 90% to 30%;
closing the first and second flow control gates at about 300 pounds of the truck trailer full load, to allow suspended dust contained in a spout and spout dust collector to come to rest in the truck trailer; and
assuring that the truck trailer loading is of correct weight by using on-scale loading where the truck trailer is completely on a scale for weighing.

8. The Fully Automated Cement Horizontal Storage method of claim 1 wherein providing automation for the stacking of cement or bulk material, the reclaiming of cement or bulk material, and the dispatching of cement or bulk material from the horizontal storage comprises providing encoders and limit switches arranged along sectors of the horizontal storage to monitor position of the mechanical reclaimer by providing limit switches at the mechanical reclaimer to indicate position and inclination of the reclaiming main structure of the mechanical reclaimer, providing vibrating sensors at the mechanical reclaimer to indicate speed of a mechanical reclaimer and vibrating sensors to indicate depth of the blades of the mechanical reclaimer main structure inside the cement or bulk material to be reclaimed, providing, programmable logic controllers placed in the mechanical reclaimer and throughout the horizontal storage which are programmed to control, through sequential control and feedback control, the reclaiming of cement or bulk material from the horizontal storage.

* * * * *